(12) United States Patent
Howe

(10) Patent No.: US 8,905,594 B2
(45) Date of Patent: Dec. 9, 2014

(54) FRAMELESS LIGHT MODIFYING ELEMENT

(71) Applicant: Leslie David Howe, Atlanta, GA (US)

(72) Inventor: Leslie David Howe, Atlanta, GA (US)

(73) Assignee: Southpac Trust International, Inc, Trustee of the LDH Trust, Rarotonga (CK)

( * ) Notice: Subject to any disclaimer, the term of this patent is extended or adjusted under 35 U.S.C. 154(b) by 0 days.

(21) Appl. No.: 14/225,546

(22) Filed: Mar. 26, 2014

(65) Prior Publication Data

US 2014/0204590 A1 Jul. 24, 2014

Related U.S. Application Data

(63) Continuation of application No. PCT/US2013/039895, filed on May 7, 2013.

(60) Provisional application No. 61/848,526, filed on Jan. 7, 2013, provisional application No. 61/795,420, filed on Oct. 17, 2012, provisional application No. 61/742,251, filed on Aug. 6, 2012, provisional application No. 61/741,669, filed on Jul. 26, 2012.

(51) Int. Cl.
*F21V 5/00* (2006.01)
*F21V 17/00* (2006.01)
*F21V 11/00* (2006.01)
*G02B 5/00* (2006.01)

(52) U.S. Cl.
CPC ............... *F21V 11/00* (2013.01); *F21V 17/00* (2013.01); *G02B 5/00* (2013.01); *F21V 5/002* (2013.01)
USPC ....... 362/311.01; 362/330; 362/374; 362/455

(58) Field of Classification Search
CPC ............ F21V 5/00; F21V 11/00; F21V 11/16
USPC .......... 362/16, 18, 97.4, 311.01, 311.14, 330, 362/351, 352, 355, 360, 374, 375, 450, 455, 362/456, 223, 235, 433
See application file for complete search history.

(56) References Cited

U.S. PATENT DOCUMENTS 6,467,209 B1 10/2002 Vickers
7,396,150 B2 * 7/2008 Ogawa et al. ................. 362/607

(Continued)

OTHER PUBLICATIONS

International Search Report and Written Opinion PCT/US2013/039895 Aug. 27, 2013.

*Primary Examiner* — Alan Cariaso
(74) *Attorney, Agent, or Firm* — Troutman Sanders, LLP; James E. Schutz; Mark Lehi Jones

(57) ABSTRACT

According to one implementation of the disclosed technology, a lens is provided. The lens includes one or more pieces of optical film configured for attaching to and modifying light from a light emitting device. The one or more pieces of optical film define: a lens aperture; a front light-emitting side of the lens; a back light-receiving side of the lens; and two or more edge trusses. The edge trusses are disposed towards the back light-receiving side of the lens. Each of the two or more edge trusses include one or more sides configured from a corresponding fold in the one or more optical films, wherein at least one of the one or more sides of each of the two or more edge trusses is configured at an angle relative to the lens aperture plane to impart support to the lens and to resist deflection of each edge truss.

22 Claims, 16 Drawing Sheets

(56) References Cited

U.S. PATENT DOCUMENTS

| | | | |
|---|---|---|---|
| 7,719,628 B2 * | 5/2010 | Suh et al. | 349/58 |
| 8,596,809 B2 * | 12/2013 | Johnston et al. | 362/97.4 |
| 8,662,693 B2 * | 3/2014 | Huang | 362/97.4 |

* cited by examiner

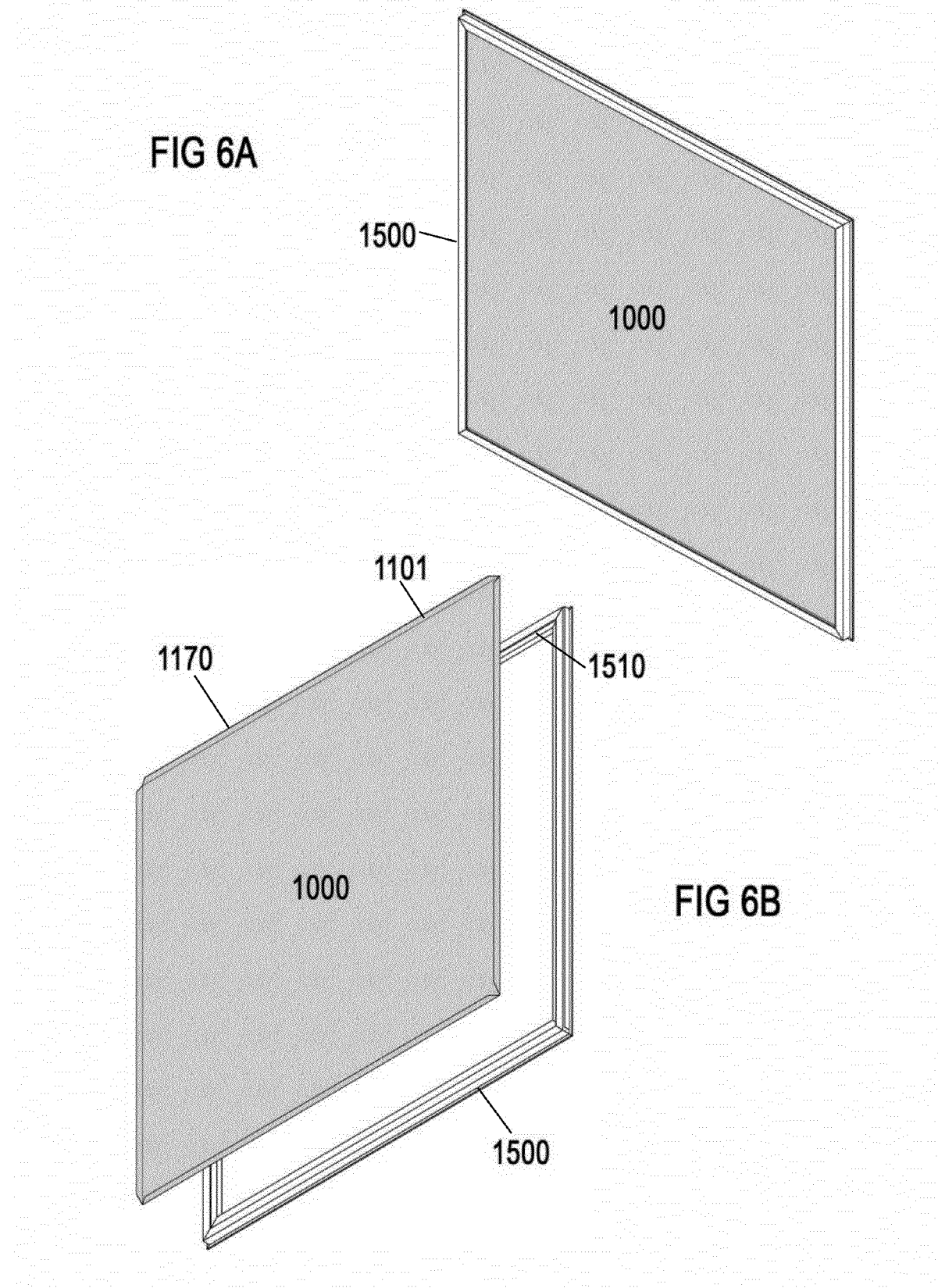

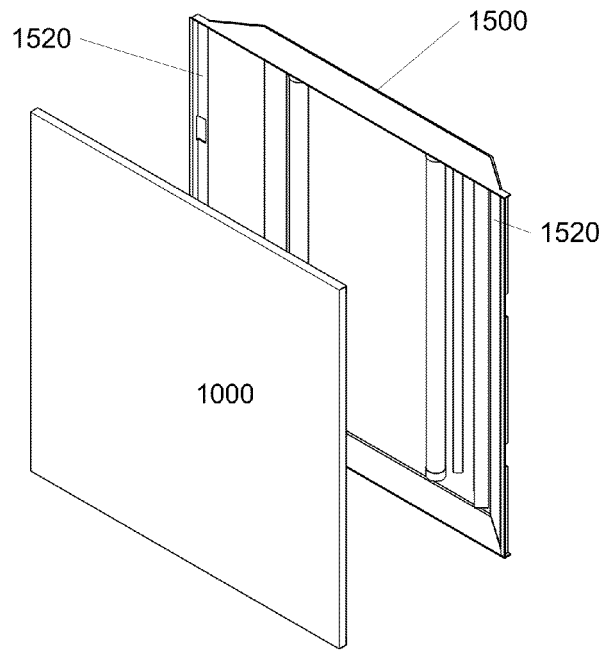
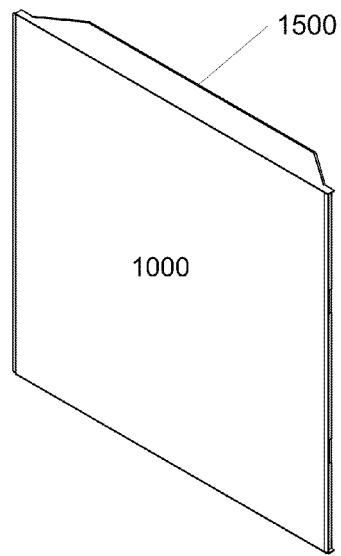
FIG 8A
FIG 8B
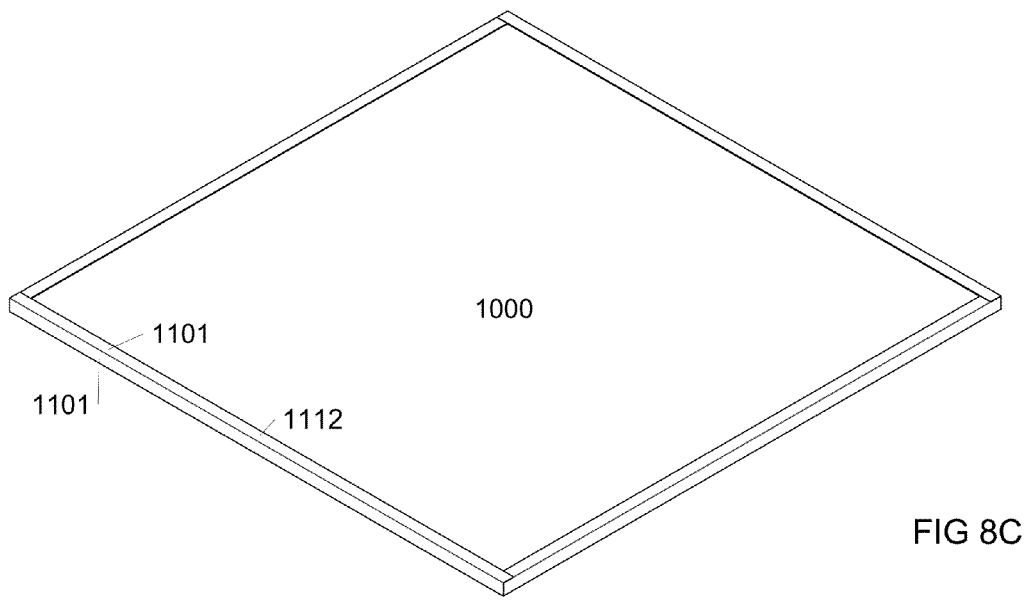
FIG 8C

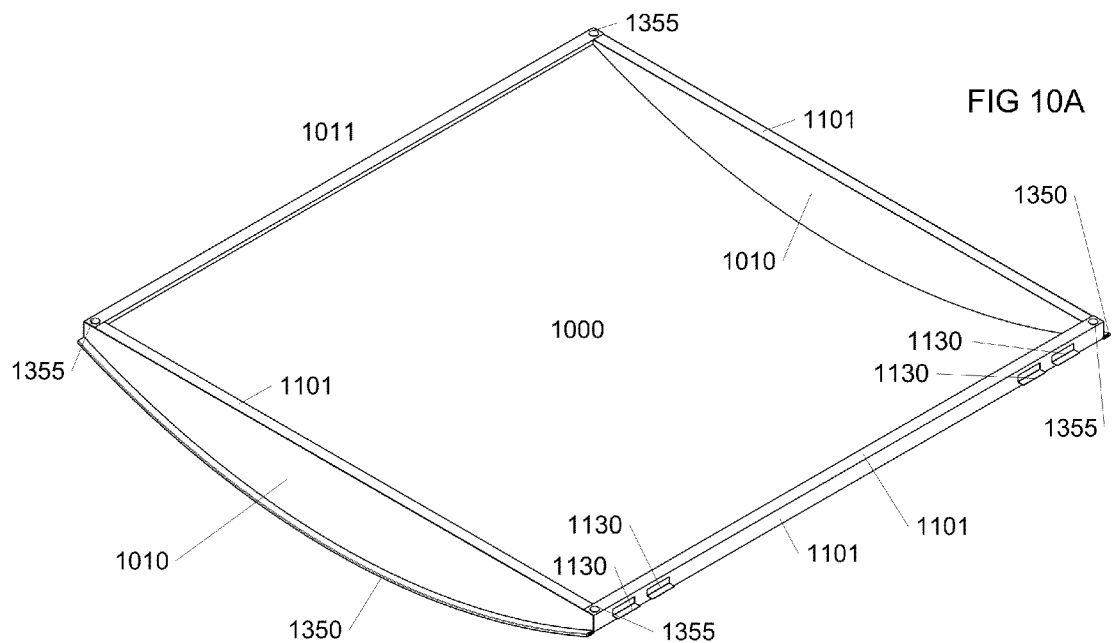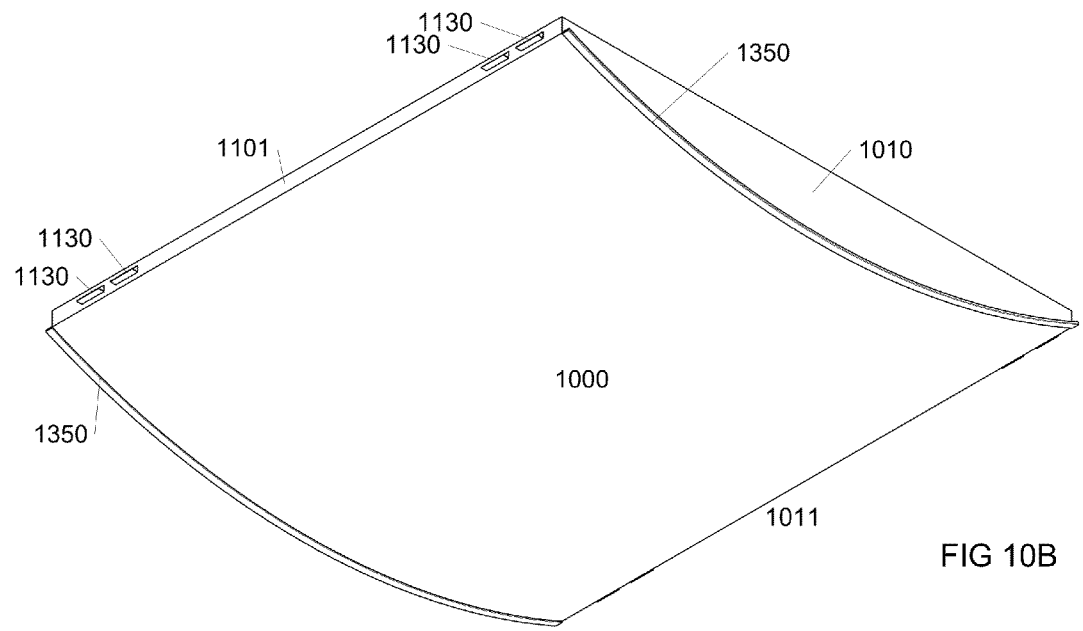

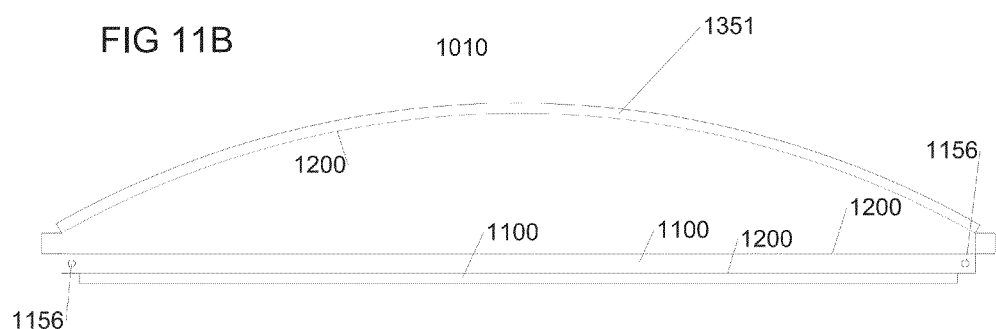
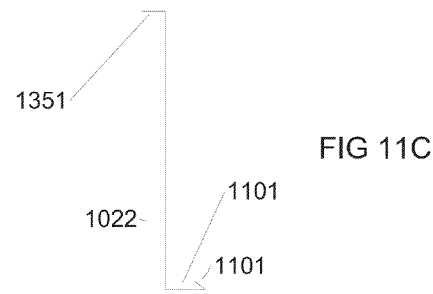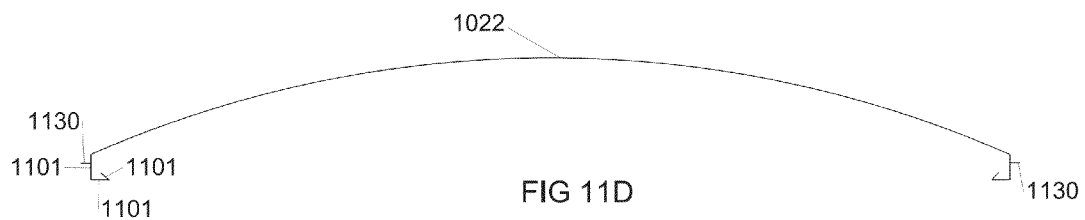

FRAMELESS LIGHT MODIFYING ELEMENT

RELATED APPLICATIONS

This application claims the benefit under 35 U.S.C. 365 of PCT application PCT/US2013/039895, entitled "Frameless Light Modifying Element," filed May 7, 2013, the contents of which are incorporated herein by reference in their entirety, as if set forth in full. PCT application PCT/US2013/039895 claims the benefit of the following United States provisional patent applications, the contents of which are incorporated herein by reference in their entirety, as if set forth in full: U.S. provisional application No. 61/741,669 entitled "Frameless Optical Film Lens" filed Jul. 26, 2012; U.S. provisional application No. 61/742,251 entitled "Frameless Optical Film Lens" filed Aug. 6, 2012; U.S. provisional application No. 61/795,420 entitled "Frameless Optical Film Lens" filed Oct. 17, 2012; and U.S. provisional application No. 61/848,526 entitled "Frameless Optical Film Lens" filed Jan. 7, 2013. This application is also related to U.S. patent application Ser. No. 12/952,765, filed Nov. 23, 2010, entitled "Light Diffusion and Condensing Apparatus"; U.S. patent application Ser. No. 13/531,515, filed Jul. 23, 2012, entitled "Light Diffusion and Condensing Fixture"; and U.S. patent application Ser. No. 12/952,765, filed Nov. 23, 2010, the contents of which are also incorporated by reference in their entirety, as if set for the in full.

TECHNICAL FIELD

This invention generally relates to lighting, light fixtures and lenses.

BACKGROUND

Lighting fixtures, whether designed for commercial or residential applications may typically utilize lens systems to control the fixture's light distribution pattern, light intensity and diffusion. There is a continuing long felt need for lens systems that can provide the required control of a light fixture's output, but do so with improved efficiency and lower manufacturing costs. These needs may be addressed by some or all of the embodiments described herein.

BRIEF DESCRIPTION OF THE FIGURES

FIG. 6A depicts a perspective of the example embodiment of a frameless optical film lens mounted in a light fixture doorframe.

FIG. 6B depicts an exploded perspective of the example embodiment of a frameless optical film lens mounted in a light fixture doorframe.

FIG. 7A depicts a cross sectional profile view of an example edge truss configuration.

FIG. 7B depicts a cross sectional profile view of an example edge truss configuration.

FIG. 7C depicts a cross sectional profile view of an example edge truss configuration.

FIG. 7D depicts a cross sectional profile view of an example edge truss configuration.

FIG. 7E depicts a cross sectional profile view of an example edge truss configuration.

FIG. 7F depicts a cross sectional profile view of an example edge truss configuration.

FIG. 7G depicts a cross sectional profile view of an example edge truss configuration.

FIG. 7H depicts a cross sectional profile view of an example edge truss configuration.

FIG. 7I depicts a cross sectional profile view of an example edge truss configuration.

FIG. 7J depicts a cross sectional profile view of an example edge truss configuration.

FIG. 8A depicts an exploded perspective view of a recessed troffer lighting fixture with an example embodiment of frameless optical film lens.

FIG. 8B depicts a perspective view of a recessed troffer lighting fixture with an example embodiment of a mounted frameless optical lens.

FIG. 8C depicts a perspective view of the back side of the example embodiment of the frameless optical lens 1000 as depicted in FIG. 8A.

FIG. 10A shows a perspective view of the back side of an example embodiment of an assembly including a curved frameless optical lens center section.

FIG. 10B shows a perspective view of the top side of the example embodiment of an assembly including a curved frameless optical film center section depicted in FIG. 10A.

FIG. 11B depicts an optical film cutting template for the side optical film sections of the example embodiment depicted in FIG. 10A.

FIG. 11C depicts a side profile view of the configured optical film side sections of the example embodiment depicted in FIG. 10A.

FIG. 11D depicts a side profile view of the configured optical film center section of the example embodiment depicted in FIG. 10A.

SUMMARY

Figure 1:
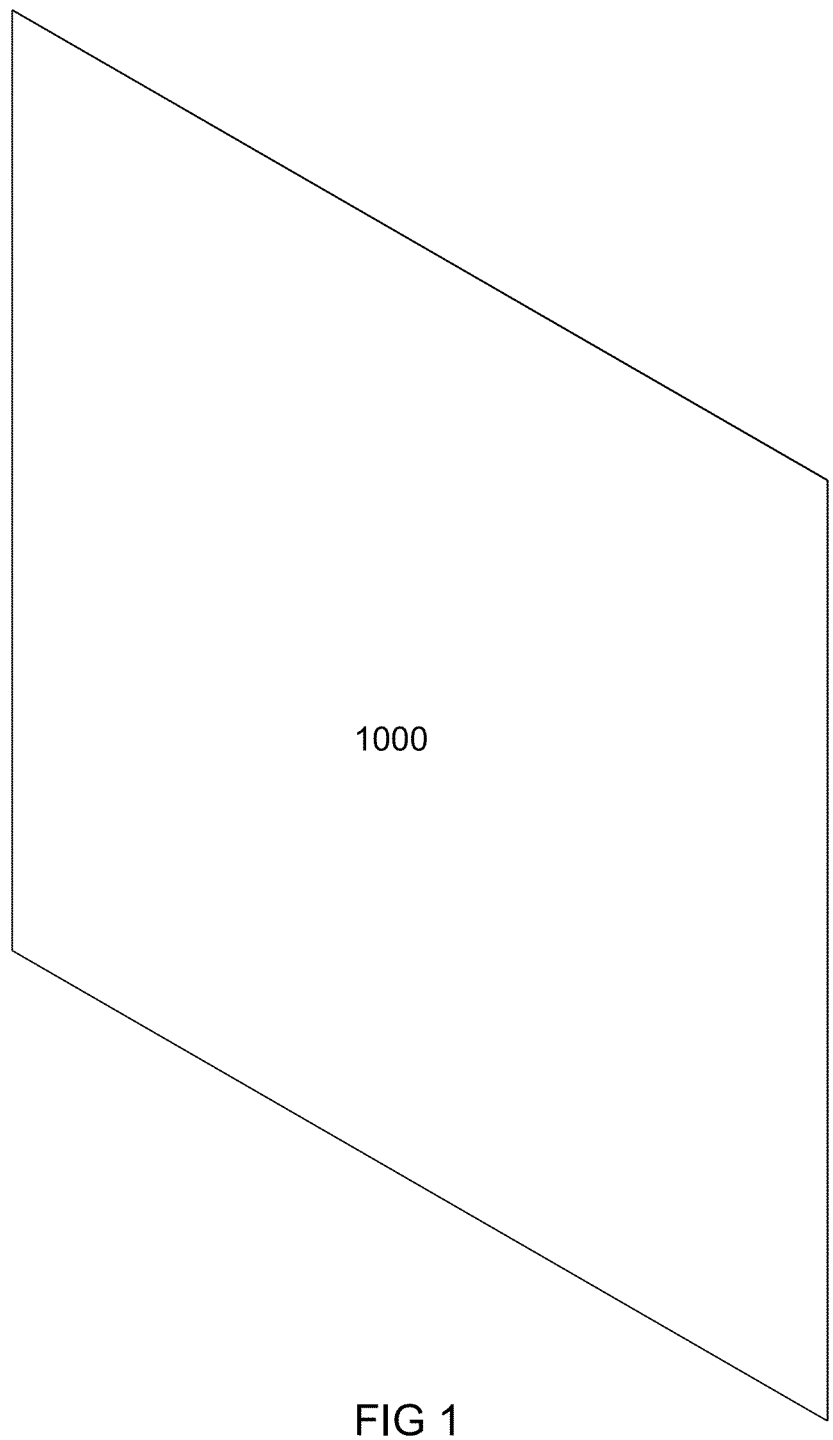
FIG. 1 depicts a perspective view of a sheet of optical film.

According to various implementations of the disclosed technology, a light modifying element is provided. In one example implementation, the light modifying element includes one or more optical film pieces characterized by one or more edge trusses disposed at two or more opposing edges of at least one of the one or more optical film pieces. The one or more edge trusses are characterized by one or more folds of at least a portion of at least one of the one or more optical film pieces. The one or more edge trusses disposed at two or more opposing edges are further configured to support the one or more optical film pieces in a substantially planar configuration.

An example embodiment of the disclosed technology includes a lens comprising: one or more pieces of optical film configured for attaching to and modifying light from a light emitting device, the one or more pieces of optical film defining: a lens aperture having a lens aperture plane defined by two or more edges of at least a portion of the optical film; a front light-emitting side of the lens; a back light-receiving side of the lens; and two or more edge trusses configured from and corresponding to the two or more edges defining the lens aperture plane, wherein the two or more edge trusses are disposed towards the back light-receiving side of the lens. Each of the two or more edge trusses include one or more sides configured from a corresponding fold in the one or more optical films, wherein at least one of the one or more sides of each of the two or more edge trusses is configured at an angle relative to the lens aperture plane to impart support to the lens and to resist deflection of each edge truss.

An example embodiment of the disclosed technology includes a light-modifying element for modifying light from a light emitting device. The light-modifying element includes: at least one piece of optical film, the at least one piece of optical film comprising: four edges; a light-emitting front side; and a light-receiving back side; and at least one fold on each of the four edges, wherein each fold defines an edge section at an angle relative to the light-emitting front side, and wherein each of the four edges are disposed towards the light-receiving back side, and wherein each edge section imparts structural support to the light modifying element such that the light modifying element will be disposed in a substantially flat configuration when suspended from four or more points along two or more edge sections, or when suspended along all or a portion of a periphery of the front side of the at least one optical film piece.

An example embodiment of the disclosed technology includes a light fixture. The light fixture includes an enclosure having an aperture; a light source disposed inside the enclosure; and a lens covering all or a portion of the aperture, the lens configured for modifying light from the light source and comprising at least one piece of optical film, the at least one piece of optical film comprising: four edges; a light-emitting front side; a light-receiving back side; and at least one fold configured along each of the four edges, wherein each fold creates an edge section at an angle relative to the light-emitting front side, and wherein each edge section is disposed towards the light-receiving back, and wherein each edge section imparts structural support to the light modifying element such that the light modifying element will be disposed in a substantially flat configuration when suspended from four or more points along two or more edge sections, or when suspended along all or a portion of a periphery of the light-emitting front side.

An example embodiment of the disclosed technology includes a light fixture. The light fixture includes an enclosure with an aperture; a light source disposed inside the enclosure; and one or more lenses covering all or a portion of the aperture, the one or more lenses configured for modifying light from the light source, and comprising at least one piece of optical film with a thickness of under 325 um, wherein the at least one piece of optical film is disposed in a substantially planar configuration without mechanical tensioners or a supporting substrate.

According to another example implementation of the disclosed technology, a light modifying element is provided. In an example implementation, the light modifying element includes one or more optical film pieces characterized by a substantially curved optical film center section and two side sections. In an example implementation, each of the two side sections include at least one curved edge, wherein two opposing edges of the optical film center section are configured for fastening to the at least one curved edge of each of the side sections. In an example implementation, the optical film center section is characterized by one or more edge trusses disposed at two opposing edges of at least one of the one or more optical film pieces. The one or more edge trusses are characterized by one or more folds of at least a portion of at least one of the one or more optical film pieces, and the one or more edge trusses are further configured to support the light modifying element in a substantially planar configuration in at least one direction.

DETAILED DESCRIPTION

Embodiments will be described more fully hereinafter with reference to the accompanying drawings, in which example embodiments are shown. The disclosed technology may, however, be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

It should be clearly understood that the embodiments described herein are examples, and may be adapted for use with many different designs and configurations including, but not limited to: different dimensions, different optical film configurations, different mounting configurations, different fabrication materials, different light fixture enclosures etc.

Various methods, concepts, designs, and parts may be combined to produce desired operating specifications for light fixtures, light fixture retrofits, lenses, film assemblies according to example embodiments, and will be described with reference to the accompanying figures.

Various types and aspects of optical films that may be originally designed primarily for use with display backlight units will be subsequently briefly described. Their configurations, photometric performance, advantages and disadvantages with respect to their utilization with example embodiments of lens assemblies and light fixtures may vary. In addition, photometric requirements for different light fixtures may vary widely based on their configurations and intended applications. Accordingly, when example optical film configurations are described in example embodiments, such as the type of lenticular optical films or diffusion films, they may be construed as illustrative examples only, and should not be construed to in any way to limit the scope of possible optical film configurations. Any types of optical films that may be advantageous to a particular lens assembly, light fixture or lighting application thereof, may be construed as to be intended in any relevant example embodiments.

For brevity, elements, principals, methods, materials or details in example embodiments that are similar to, or correspond to elements, principals, methods, material or details elsewhere in other example embodiments in this application, or related applications, may or may not be repeated in whole or in part, and should be deemed to be hereby included in the applicable example embodiment.

Backlights units (BLU), as used in LCD displays for example, in a basic form, may include a light source, a rear reflector, a diffuser plate disposed in front of the light source, a lenticular optical film disposed on the diffuser plate, and a diffuser film disposed on top of the lenticular film. Together, these elements may form a "light recycling cavity" or LRC.

The principles of lenticular optical films and BLUs are well known and understood to those skilled in the arts, and for brevity, they will not be discussed at length here. However, generally speaking, lenticular optical films typically have a smooth surface, and a structured surface. Off axis light incident on the smooth surface of the film may be refracted through the film, more towards the normal of the axis of the structured surface. A significant portion of light rays incident on the smooth surface of the lenticular film may be reflected backwards, becoming further scattered by subsequent multiple reflections within reflection cavity, until their angles of travel allow them to refract through the lenticular film, and exit the BLU. This recycling of light significantly increases light scattering within the BLU, and has the advantage of increased illumination uniformity across the optical aperture, and increased lamp hiding. Another advantage of BLUs is increased light output intensity due to the condensing of the light distribution pattern more towards the normal of the axis of the optical aperture.

A common lenticular optical films for BLU's may typically be prismatic films such as 3M BEF. Prismatic films typically include rows of triangular prisms, and may be able to increase maximum light intensity in a BLU by up to 70% or more with a single sheet. In addition, the proportion of incident light striking the smooth surface of the film that may be recycled may be as much as 50% or more. While significant light recycling and light intensity increase are advantages in some applications, drawbacks include the need for a top and bottom diffuser to be utilized along with the prismatic film, in order to minimize the optical artifacts of the film's operation, and a top surface covering the structured surface of the prismatic film may be desirable to protect the film. These extra films may increase costs, and may decrease efficiency. Additionally, the high degree of light condensing may come at the expense of narrowed viewing angles, which may not be advantageous in some applications. Viewing angles of BLUs with prismatic film may also be asymmetrical, which may not be ideal in some applications.

Another common lenticular film used in BLUs is lenticular diffusion film such as Kimoto Tech GM3. In a common typically used example, a lenticular diffusion film may include a diffusion surface that includes glass beads deposited on the front surface of a transparent optical film such as polyester, which may have the effect of diffusing light that refracts through the film, as well as condensing the light. The degree of condensation of refracted light, as well as the degree of light recycling may be less than that of typical prismatic films. However, two or three sheets of lenticular diffusion film may be used together to significantly increase the amount of light condensing, light recycling and diffusion properties. Lenticular diffusion films may have certain advantages over prismatic films in some applications, including:

a) The light distribution pattern of light refracted through the film may be relatively symmetrical, which may be an advantage when utilized in some applications.

b) The viewing angle may be wider, which may also be an advantage when utilized in some applications.

c) Combining multiple films together may be utilized to customize the viewing angle, customize the diffusion level, and maximum the light intensity increase.

d) Lower manufacturing costs may be achieved due to the potential decrease in the number of films needed.

e) Higher overall optical efficiency may be achieved.

BLUs may typically utilize a diffuser plate, which may function to diffuse light from the light source, as well as light reflected backwards from the lenticular film. The diffuser plate may also function as a flat rigid surface on which to mount optical films, which may comprise one or more lenticular films, polarizing film, diffusion film etc. Diffuser plates, may have the disadvantage of being thick, and incur a relatively large light loss due to absorption when compared to diffusive optical films; however they may be widely used due to their function as a suitable flat rigid mounting surface for the optical films.

BLUs are utilized extensively throughout the world in displays, such as in televisions, computer displays etc., and as a result, the market for BLU optical films such as lenticular and lenticular diffusion films is very competitive, which has led to very competitively priced films.

Optical films designed for BLU's generally range in total thickness between 100 um and 290 um, and may be cut into sheets from roll form. Accordingly, the optical films are typically very flexible, and have typically required a rigid flat surface to mount to, in order to keep them flat and free from distortions.

The continuing long felt need for lenses for lighting fixtures which can provide the required light control, but do so with improved efficiency and lower manufacturing costs may be met if some or all of the beneficial aspects of BLUs and optical films designed for BLUs as described, could be utilized in a lens system for lighting fixtures.

According to example embodiments, a lens is provided wherein one or more optical film sheets may be configured into a lens that is suitable for use with a light fixture, wherein the one or more optical film sheets do not require a frame or tensioners in order to remain substantially flat and substantially without distortions when suspended along a portion, or all of its perimeter edges. An advantage of lower manufacturing cost may be achieved in example embodiments of frameless optical film lenses where the optical films are suspended without the use of a tensioning frame or a rigid or semi rigid surface or substrate, or additional parts.

Optical film is typically manufactured in roll form. Typical thicknesses of the substrate (usually polyester or polycarbonate) with a structured surface coating may be up to approximately 300 um. Optical films of greater thicknesses may be able to be custom manufactured, but the cost of manufacturing may be significantly higher. For purposes of this application, optical films shall include all transparent or translucent film materials capable of modifying light, and which are flexible enough to crease, score or fold without breaking.

In accordance with example implementations of the disclosed technology, the optical film's substrate may typically be polyester or polycarbonate, having thicknesses of up to 300 um. Such films may be flexible, and if utilized in a conventional approach without the benefit of the disclosed technology, may not be able to lay in an acceptably flat configuration without the use of a flat substrate to mount on top of, such as a diffuser plate, or without being tensioned on a frame. For example, a conventional 2'×2' recessed "troffer" lighting fixture may have a doorframe with a typical acrylic prismatic lens mounted therein, wherein the lens may be suspended and supported around its perimeter by the doorframe. The lens may typically be approximately 3175 um thick. For example, a 250 um optical film by contrast, is approximately 1/12 as thick.

It would indeed be a new and unexpected result to those skilled in the arts if a 250 um optical film could be suspended on an example doorframe as described, and could lie acceptably flat without requiring a tensioning frame, additional parts, or a flat substrate to support it. Optical films that possess advantageous characteristics, such as high efficiency, high efficiency/diffusion ratio, lenticular properties, low cost etc., have been commercially available for many decades. The lighting industry throughout the world is a very large industry, with sales that may be in the many tens of billions of dollars per year. Despite the advantages of optical films as described, and the numerous lighting industry designers, engineers, inventors, product developers, scientists, entrepreneurs etc. that have been trying to achieve improved lens optical performance at a lower cost throughout the many decades, may so far have not envisioned the new and unexpected results possible with example embodiments which will now be described.

FIG. 1 depicts a perspective view of an optical film piece 1000 in a flat configuration. The film piece 1000 may be cut to an appropriate size from a roll of optical film. The optical film can comprise any type, such as lenticular film, diffusion film, holographic film etc. Film with a total thickness of greater than approximately 200 um, and preferably about 280 um have been found to exhibit an acceptable degree of structural rigidity in example embodiments for lens configurations in which the optical film (lenses) are suspended over spans of about 22". Thinner films may still yield acceptable results. The particular thicknesses of optical films that will yield acceptable rigidity may depend on the particular distance the film is required to span, the particular configuration in which the perimeter of the lens will be supported, and the optical film's properties.

Figure 2:
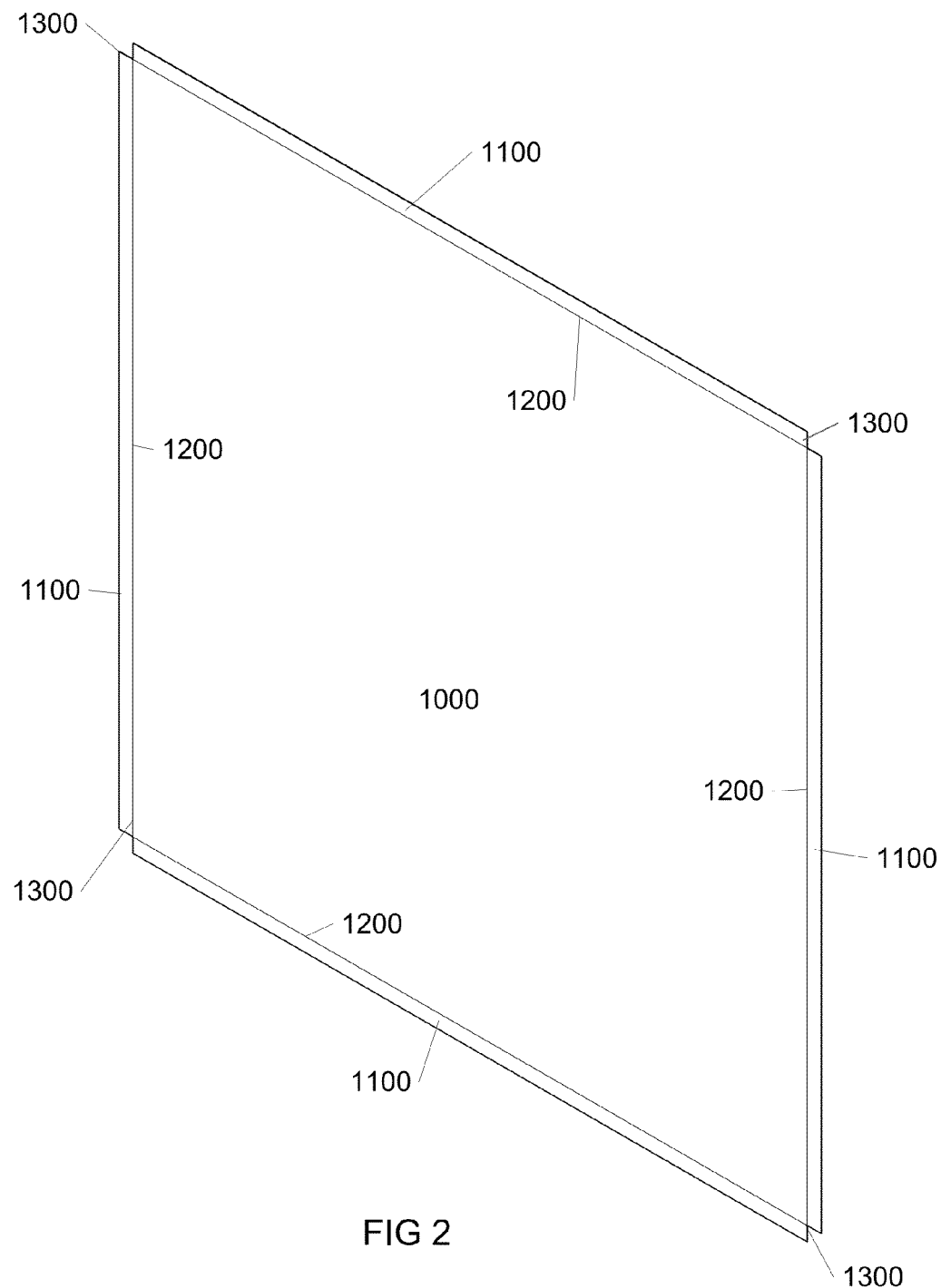
FIG. 2 depicts a perspective of the optical film shown in FIG. 1 with one score line per edge and the corners cut.

FIG. 2 depicts the same optical film piece 1000 as FIG. 1 in which, according to certain example implementations, include score lines, crimp lines, or perforated lines 1200 (which may be collectively referred to herein as "score lines") that may be cut, impressed, and/or etched along each edge on either side of the optical film 1000. In certain example implementations of the disclosed technology, the score lines may enable the optical film to be folded accurately along the lines. In the example figures, feature numbers may only be indicated for one side of the optical film piece, since the other three sides may have similar or identical features.

In an example implementation, the score lines may be made manually by applying pressure to a sharp pointed tool, for example, and drawing the tool across the film against a straight edge, such as a ruler. In another example implementation, the score lines may be perforations made with a hand held perforation wheel drawn against a straight edge. In an example implementation, creating a crimp line may involve crimping the film. For example, a wheel with a convex outer edge, such as a "V" shaped edge, may be rolled under pressure over one surface of the film against a wheel with a reciprocal concave surface on the other side of the film. The result may be a depression or ridge in the film that may enable acceptable folds to be created along their lengths. In an example implementation, the back unstructured side of the optical film may be the preferred side to create the score lines, because the film may be folded towards the back unstructured side of the optical film 1000. Score lines on the front structured side of the optical film may be visible in some applications.

Any other method of scoring/perforating/crimping the optical film may also be used. Creating the score lines may be done on machinery, which may be the most efficient and cost effective method. For example, according to one example embodiment, crimping may involve inserting an edge of the film 1000 into a vice-like mechanical structure and applying a bending force on the film 1000 with respect to the mechanical structure. Film conversion factories have automated machines specifically to cut, score, crimp and perforate optical films. One example of a machine that may be suitable to create the score lines may be an x-y film-cutting plotter made by Graphtec America. A cutting and scoring template can be created on software that can be executed by the plotter.

Scoring of the one or more optical films may be unnecessary in circumstances where mechanical folding machines are utilized, and wherein the particular machine and optical film combination will yield acceptably accurate folds. Accordingly, the steps of creating score/crimp/perforation lines in the one or more optical films may be optional steps in any of the example embodiments if mechanical folding apparatuses can adequately create the required folds.

According to an example implementation, when the edge sections 1100 of optical film 1000 are folded along the score lines 1200 away from the front structured side of the film 1000, a side edge may created, herein referred to as an "edge truss". When the optical film is configured with additional score lines 1200 additional edge sections 1100 and edge trusses for each side of the optical film piece 1000 may be created, and will be described in subsequent example embodiments.

Figure 3A:
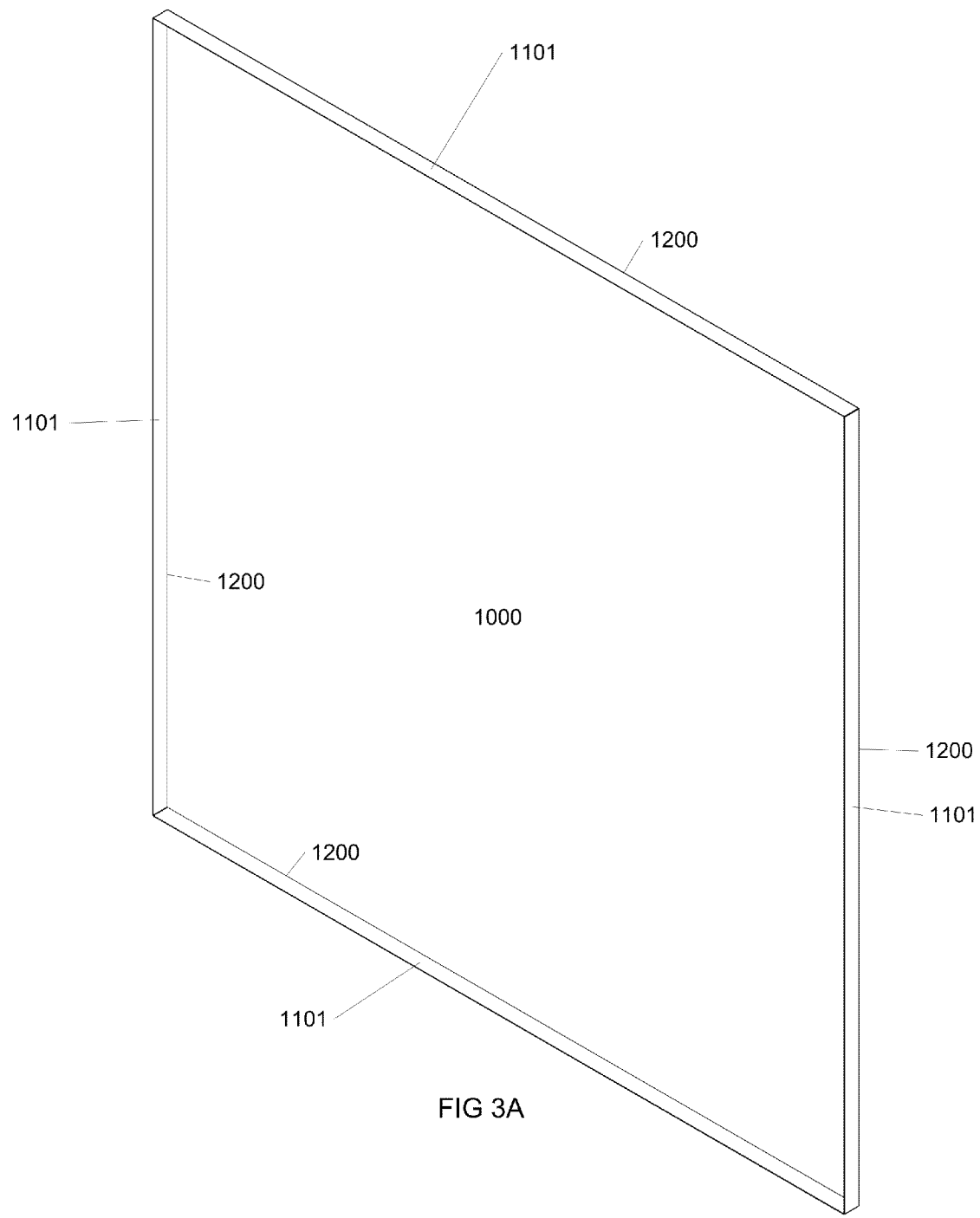
FIG. 3A depicts a perspective view of an example embodiment of a frameless optical film lens with one-sided edge trusses.

FIG. 3A depicts the same optical film as shown in FIG. 2, but with the edge sections 1100 folded. In an example implementation, the optical film piece 1000 may have the structured front surface of the film facing away from view. The optical film shown in FIG. 3A is depicted with folds along each of the score lines 1200, with folds oriented away from the structured surface of the optical film to form one-sided edge trusses 1101 made from the edge sections (for example, the edge sections 1100 in FIG. 2) for each edge of the optical film piece. The edge trusses 1101 may be folded to an angle of about 90 degrees or greater. The optical film 1000 with edge trusses 1101 as shown may comprise an example embodiment of frameless optical film lens, which may be suitable for use with a lighting apparatus or light fixture.

Utilizing one edge truss 1101 per lens side may have an advantage of lower manufacturing cost when compared to the other example embodiments due to the lower surface area of optical film used, and less score lines and folds per side. Although this example embodiment may have less structural rigidity than other example embodiments, it may have sufficient rigidity for many applications.

In example embodiments, the optical film piece may be configured wherein the corners are cut to an angle of about 45 degrees as a manufacturing aid to allow sections of film on one side of an optical film piece to be folded without contacting folded sections on an adjacent side of the optical film piece. Other cutting patterns in the corners may be utilized that are suitable for the required application. For example, a square corner cut pattern 1300 as shown in FIG. 2, when folded along the score lines 1200, may yield a final configuration as shown in FIG. 3A. This configuration may be suitable for some applications. In some applications, adhesive tape may be applied to the corners to give additional structural stability to the corners.

Figure 3B:
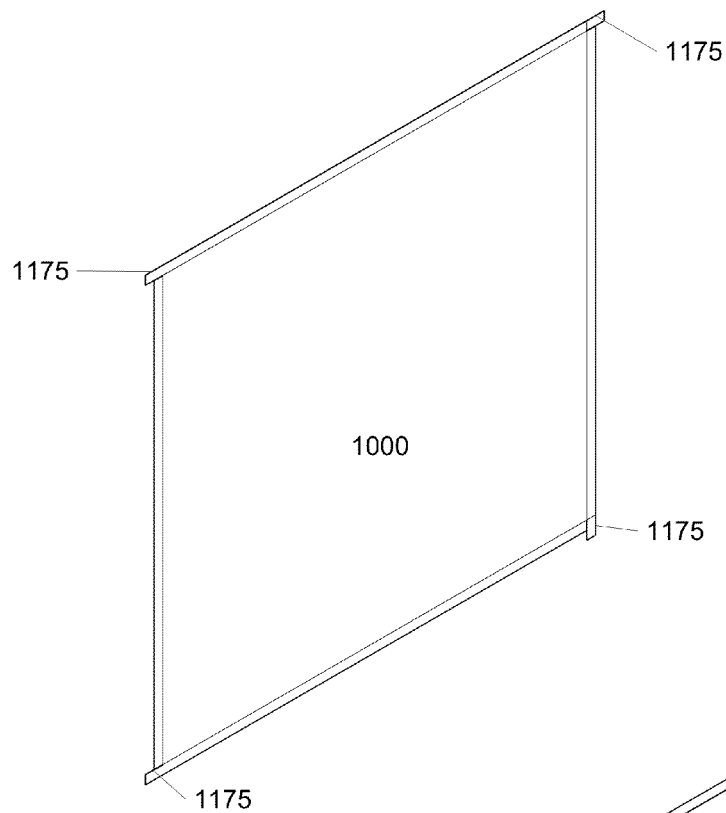
FIG. 3B depicts a perspective of an optical film configured with one score line per edge and configured with corner tabs.
Figure 3C:
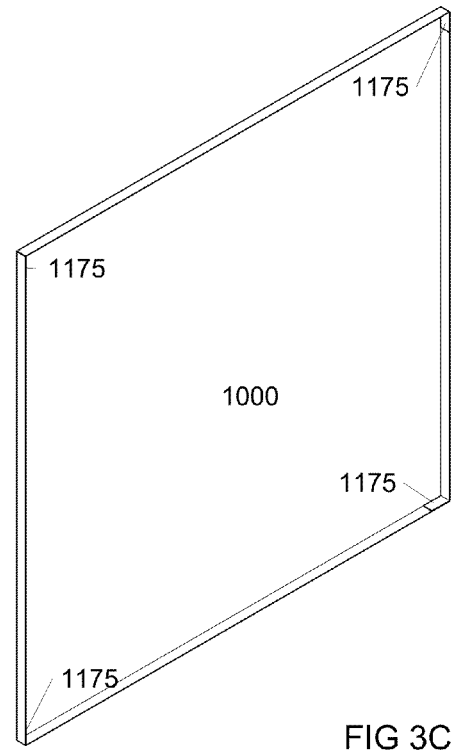
FIG. 3C depicts a perspective view of an example embodiment of a frameless optical film lens with one-sided edge trusses and corner tabs.

In one example implementation, as shown in FIG. 3B, the optical film sheet 1000 may be configured with tabs 1175. When folded, as shown in FIG. 3C, and according to one example implementation, the tabs 1175 from each side may overlap the adjacent edge truss. According to an example implementation of the disclosed technology, the tabs 1175 may secured with adhesive, adhesive tape, metal or plastic rivets etc. This type of corner configuration may give a more professional visually pleasing appearance to example embodiments of frameless lenses. Certain example implementations (for example, as depicted in FIG. 3C) may include one edge truss per side. Other example embodiments may include tabs 1175 that may be configured on any edge truss corner of example embodiments, and with multiple edge trusses per side.

According to certain example implementations of the disclosed technology, edge trusses may create sufficient rigidity to allow the lens (for example, made from an optical film sheet) to define an acceptably flat surface when supported along all, or a portion of its perimeter. For example, certain lens mounts may include a mounting channel in a doorframe of a recessed troffer lighting fixture. Through experimentation, it has been determined that two-sided edge trusses may create sufficient rigidity along each edge of the optical film in applications utilizing an example embodiment of frameless lens with an optical film thickness of over 250 um, and suspended over a span of about 22". Once the required threshold of rigidity along the edges of the optical film is met, adding further rigidity to the edge trusses may not affect the ultimate flatness of the lens surface. Accordingly, adding bracing of any type to the edge trusses, such as right-angled extrusions, flat bars, extruded clips attached to the film edges, or adding corner braces to the corners, may not enhance the flatness of the lens surface. Such bracing may however, function to improve the cosmetic appearance, serve to enable easier mounting or attachment to a light fixture in some applications, and may also create a more robust lens which may be able to accept a higher degree of abuse during handling, mounting or dismounting. Accordingly, any such additional support or bracing as described may be a matter of design choice or preference, rather than a functional requirement for an acceptably flat lens configuration. According to an example implementation of the disclosed technology, three or more edge trusses may be configured into example embodiments, and may serve to make the lens more mechanically robust, which may be advantageous during installation, and may give a more professional and substantial appearance.

According to certain example implementations of the disclosed technology, edge trusses may also function to help hold the lens in place within a light fixture lens-mounting channel, as shown in FIGS. 6A and 6B. For example, FIG. 6A depicts a rear perspective view of a simplified lens doorframe 1500 from a typical recessed troffer light fixture with an example embodiment of frameless lens 1000 with one-sided edge trusses mounted inside the doorframe 1500. FIG. 6B depicts the lens-mounting channels 1510 in doorframe 1500 that may house an acrylic lens such as a standard acrylic prismatic lens. In certain example implementations, edge trusses 1101 may be sized such that when mounted into a lens mounting channel 1510, the top edges 1170 of each edge truss 1101 may contact the upper edge of the lens mounting-channel 1510, which may function to hold the lens flat against the bottom edge of the lens mounting channels 1510, and to secure it within the lens mounting channels 1510. Example embodiments with two or three-sided edge trusses 1101 may be configured in a similar manner, wherein the side of each edge truss 1101 which borders on the face of the lens 1000 may be sized wherein the upper edge of the edge truss 1101 may contact the upper edge of the lens mounting channel 1510.

In applications where example embodiments of frameless lenses with film thicknesses of about 280-290 um, and which are required to span distances approximately 22", as may be required for standard 2'×2' recessed troffer light fixtures, edge trusses may be required on all four edges of the optical film, or visually unacceptable sagging of the lens surface may occur. However, in applications where the span that the lens is required to be suspended over is decreased, or the film thickness is increased, it may be possible and/or preferable to utilize an example embodiment with edge trusses being configured on only two opposing sides of the optical film. The advantage of edge trusses on only two opposing edges of the optical film compared to four may be a cost savings realized by less optical film being used, as well as a savings of manufacturing resources used to create score lines and folds on the other two sides. The determination of whether to configure an example embodiment with edge trusses on two or four edges of the optical film may be subjectively based on whether the lens appears acceptably flat when mounted on a light fixture. Simple experimentation and observation with optical films having varying numbers of edge trusses may aid in a determination as to the appropriate number of edge trusses that may be included for acceptable film support and flatness. These principles described may be applicable to all example embodiments disclosed herein.

It should be noted that the drawings shown and disclosed herein depict certain example embodiments configured with 90-degree folds. In practice however, when optical film is folded, precise folding angles may not be able to be created due to the elasticity of the optical film's composition and the practicalities of creating folds. For example, a section of 250 um thick optical film folded along a score line may typically be folded to the maximum angle of 180 degrees in order to set the crease. When the folding force is released, the folded section may spring back to approximately 120 degrees, and the folded section may be manually manipulated thereafter to make the desired final fold angle. In certain embodiments, variance in the final fold angles may not affect the functionality of example embodiments with respect to being able to remain substantially flat and without distortions when suspended along a portion, or all of its perimeter edges. In certain example implementations, the initial fold angle and/or the folding method, for example, may be controlled to enhance certain features. For example, in certain example embodiments, the fold(s) may be configured to provide gripping retention with mounting channels associated with a light fixture.

FIG. 7A through 7J depicts cross sectional side views of various example embodiments configured with different edge truss configurations. These example embodiments with different edge configurations represent only some of the configurations possible. The mounting requirements and configuration of each light fixture application may dictate which edge truss configuration may be the most suitable. Other permutations of edge truss configurations not shown in FIG. 7A-7J may also be suitable for a given application, and are to be included within the scope of the disclosed technology.

In accordance with certain example implementations of the disclosed technology, the rigidity of each edge of example embodiments of frameless lenses may increase with the number of folds. With one-sided edge trusses, it may be more important to have the fold angle approximately 90 degrees in order to maximize the rigidity of the edge truss. As previously discussed, when edge trusses with two or more sides are utilized, the edge trusses may exhibit rigidity that may be sufficient for most applications. Accordingly, there may be no requirement to have the folds near 90 degrees, and a relatively wide range of fold angle combinations may be acceptable which may yield acceptable rigidity, for example, as shown in FIG. 7A-J. The criteria for determination of the fold angles may therefore be a function of lens mounting, installation, required rigidity and cosmetic considerations for a given application.

Figure 4:
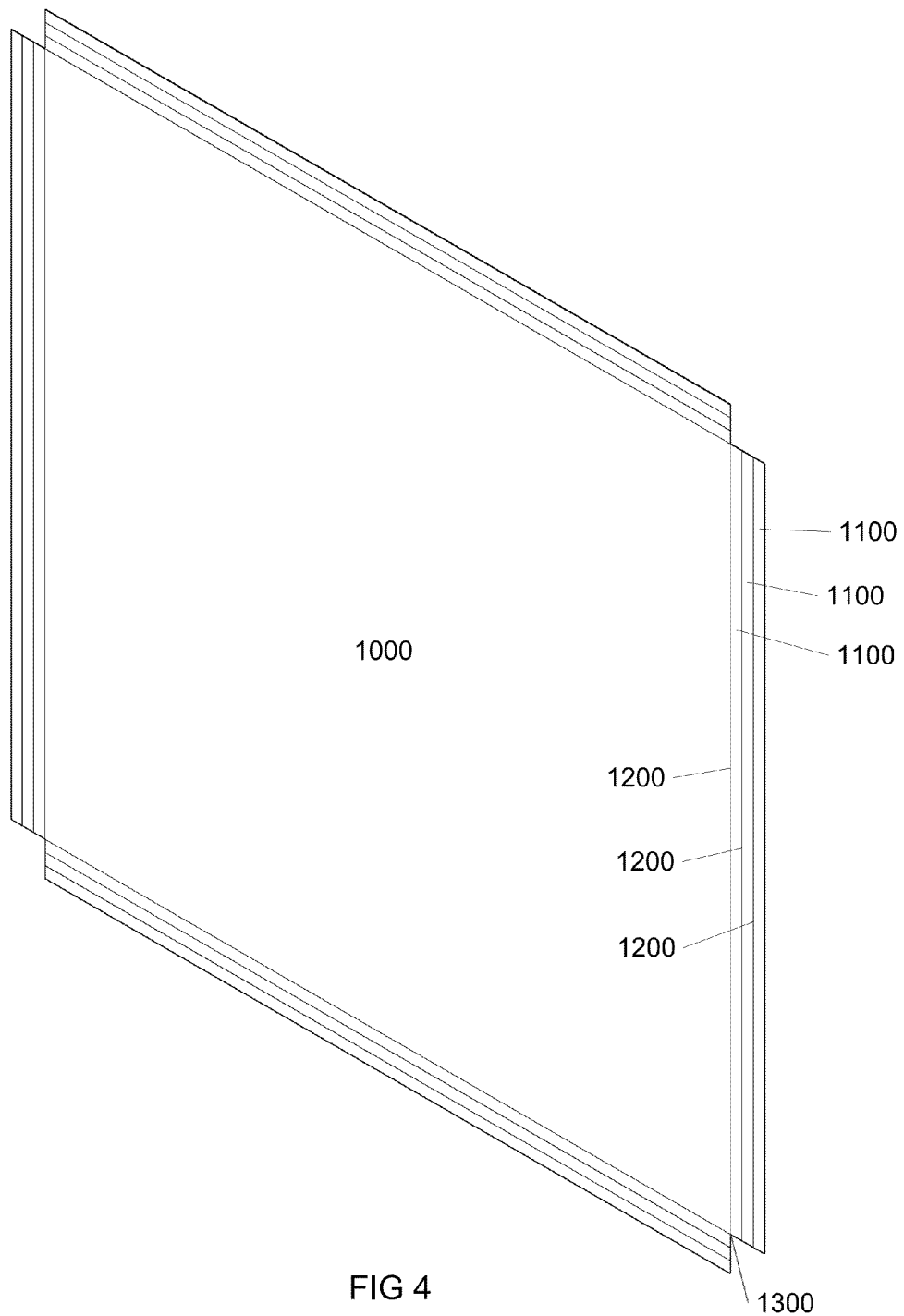
FIG. 4 depicts a perspective of the optical film with three score lines per side and the corners cut.

Another example embodiment of frameless optical film lens will now be described. FIG. 4 depicts a piece of optical film 1000 similar to that of the first example embodiment, with score lines 1200 created as previously described, along with the edge sections 1100 which are created between the score lines. In this example embodiment, two extra score lines per film side may be created such that when the optical film is folded along the score lines, and inward and away from the front structured surface of the optical film, three-sided edge trusses may be created. Again, the corners 1300 may be cut, as previously described.

Figure 5:
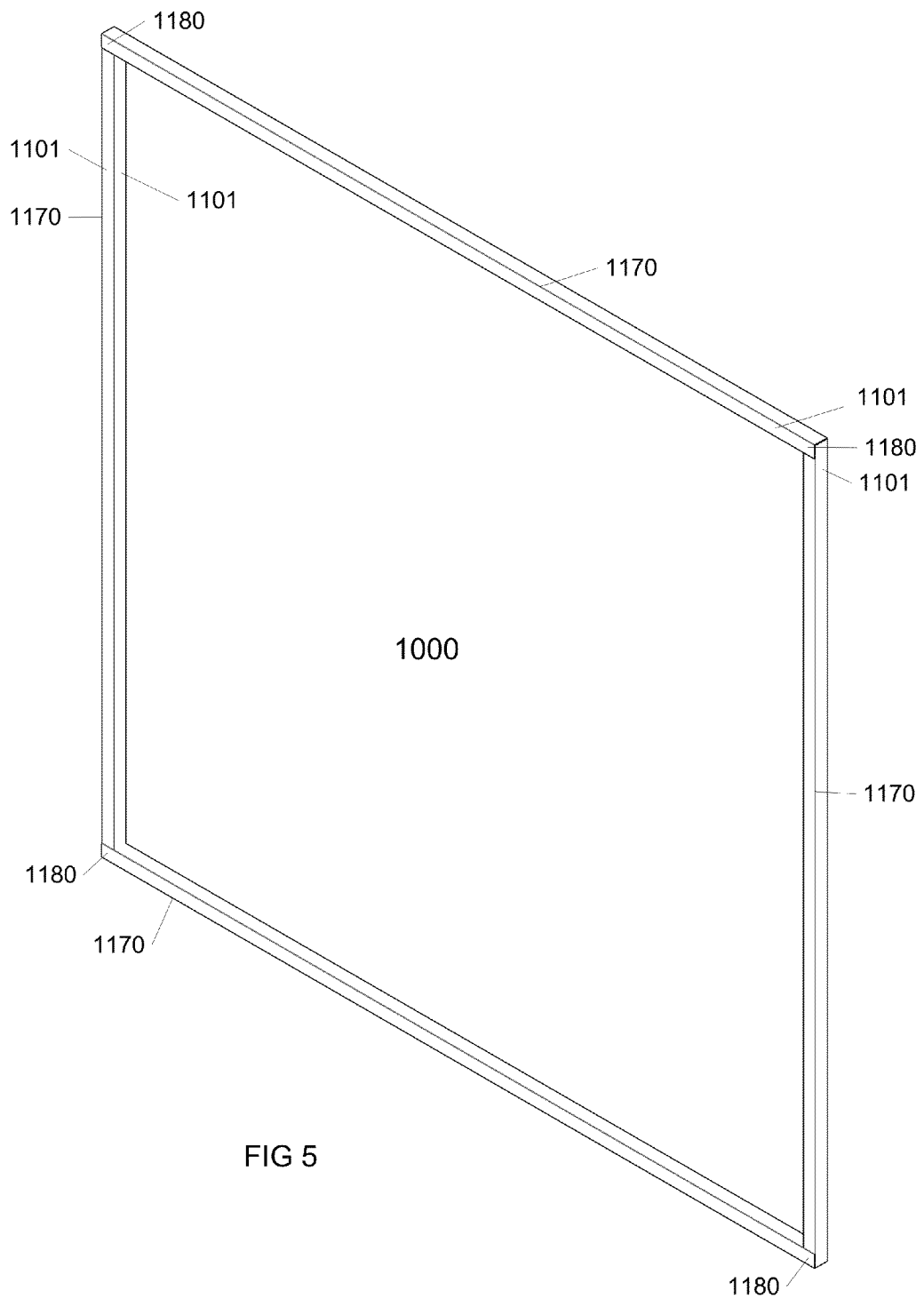
FIG. 5 depicts a perspective view of an example embodiment of a frameless optical film lens configured from the optical film depicted in FIG. 4, which may comprise three-sided edge trusses.

FIG. 5 shows a perspective rear view of the example embodiment of frameless optical film lens 1000 with three-sided edge trusses 1101. The edge trusses 1101 as shown, may be in a substantially square configuration. However, in other example embodiments, the fold angles do not necessarily need to be 90 degrees as previously discussed.

As shown in FIG. 5, an edge truss 1101 at each corner may overlap the edge truss 1101 adjacent to it, creating a square overlap area 1180. Adhesive, adhesive tape, rivets or any other suitable method of fastening may be applied to the overlap area 1180 to secure adjacent edge trusses 1101 to each other. The described configuration may give optimal corner rigidity, and may give a professional "finished" look to the lens.

Two optical films may be utilized in example embodiments of frameless optical film lenses, for example, by nesting the second frameless optical film lens inside the first lens, wherein the second lens has been sized slightly smaller, such as approximately 1/16" on each major dimension for example. Subsequent additional optical films may be utilized in any of the example embodiments using the same method. When more than one optical film is utilized in an example embodiment of frameless optical film lens, the additional lenses may not require edge trusses, and may comprise only a piece of optical film that has been sized appropriately to nest inside the first lens. The second or multiple subsequent lenses may be held sufficiently secure within the first lens with example embodiments comprising two or three sided edge trusses 1170. When the first lens comprises only a single-sided edge truss as previous described, staples or adhesives etc. may be utilized if necessary. In addition, the second or subsequent lenses may be configured with edge or corner tabs that may be folded and attached to the edge trusses of the previous lens with rivets, adhesive tape etc.

Certain edge truss configurations, such as the configuration shown in FIG. 7J for example, may be suitable for an example embodiment of frameless lens wherein the lens may mount in a light fixture without requiring a doorframe. FIG. 8B depicts an embodiment of frameless lens 1000 mounted on a typical recessed troffer light fixture enclosure 1500, and FIG. 8A depicts an exploded view of FIG. 8B. FIG. 8C depicts the frameless lens 1000 from FIG. 8A and FIG. 8B upside down, wherein the visible lens surface faces the inside of the troffer enclosure 1500. The lens may be configured with three edge trusses 1101 per side, wherein an example profile of the edge truss configuration is shown in FIG. 7J.

Referring to FIG. 8A, troffer doorframe lip 1520 may serve to function as the mounting base of frameless lens 1000, where surface 1520 may mate with edge truss surface 1112 on FIG. 8C. In certain example implementations, the surfaces may be secured to each other with hook and loop fasteners, such as low profile Velcro attached to the mating surfaces. In an example implementation, one fastener per corner may be sufficient to secure the frameless lens 1000 to the troffer enclosure 1500.

As an alternative embodiment to hook and loop fasteners, and since light fixture enclosures are typically fabricated from steel, a magnet may be attach to the underside of the edge truss surface 1112 in FIG. 8C of one or more corner of the frameless lens 1000, which may securely attach the lens 1000 to the troffer enclosure 1500 when mated. Both methods described to secure the lens 1000 to the enclosure 1500 may have the advantage of not being visible from outside the enclosure when the light fixture is illuminated. Other example embodiments may utilize fastening clips for securing the lens 1000 to the enclosure. Yet other example embodiments may utilize tabs on the edge trusses that may protrude into holes in the fixture enclosure 1500.

A novel method of attaching an example embodiment of frameless lens to a light fixture enclosure will now be described with reference to FIG. 9B, which depicts a rear perspective view (facing the back of the lens) close up of one corner of an example embodiment of frameless lens. In an example embodiment, the side of an edge truss 1101 may be configured with tabs 1130. In certain example implementations, the flat optical film piece, from which the example embodiment of lens is configured, may include two or more three sided cuts through the film to create tabs. The tab may subsequently be folded outwards towards the outside of the lens as shown.

Figure 9A:
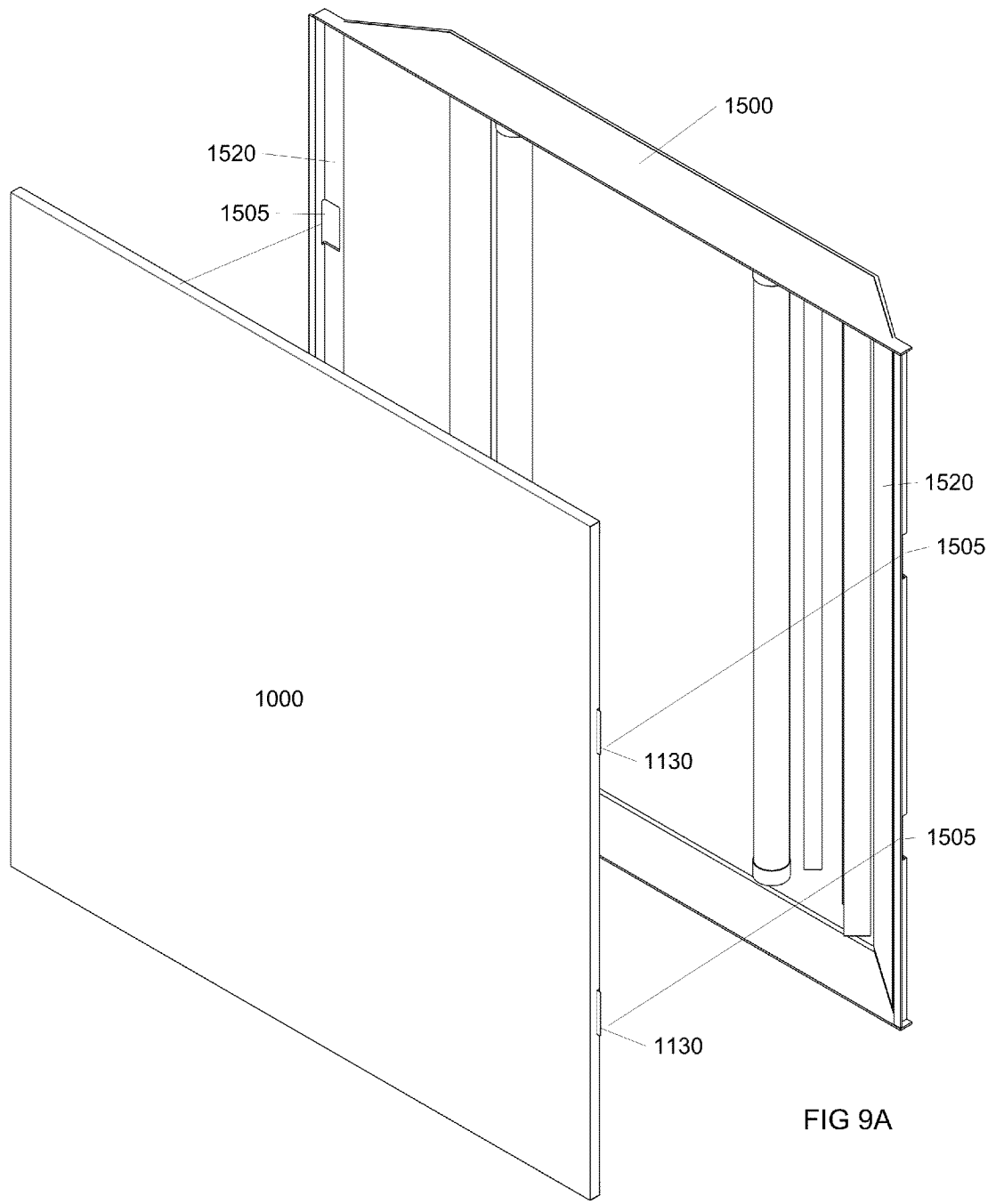
FIG. 9A depicts a perspective exploded view of a troffer light fixture and an example embodiment of a frameless optical lens with mounting tabs.

Referring to FIG. 9A, a troffer enclosure 1500 may include slots or holes 1505 near the front edges through which doorframe latches or hinges may attach. The lens 1000 may be inserted into the troffer enclosure 1500 such that the tabs 1130 may nest in holes or slots 1505. When configured with the appropriate size, angle of fold, and placement, the tabs 1130 may protrude through the holes or slots 1505 and contact one or more edges of the holes or slots 1505, wherein the lens 1000 may be held secure against the troffer doorframe lip 1520. The number of tabs per lens required may vary depending on the lens dimensions, light fixture enclosure configuration, and the desired attachment force etc. In certain example implementations, two tabs 1130 per lens may be situated diagonally from each other. In certain example embodiments, this configuration may be the minimum requirement. In other example implementations, two tabs on each of two opposing sides of the lens may be utilized to produce a more robust and stable configuration. In certain example implementations, ease of installation may be a deciding factor in the number and placement of tabs 1130. In certain example implementations, the width of the tabs 1130 may be increased as needed to increase the holding force of the tabs 1130 to the light fixture 1500.

Figure 9B:
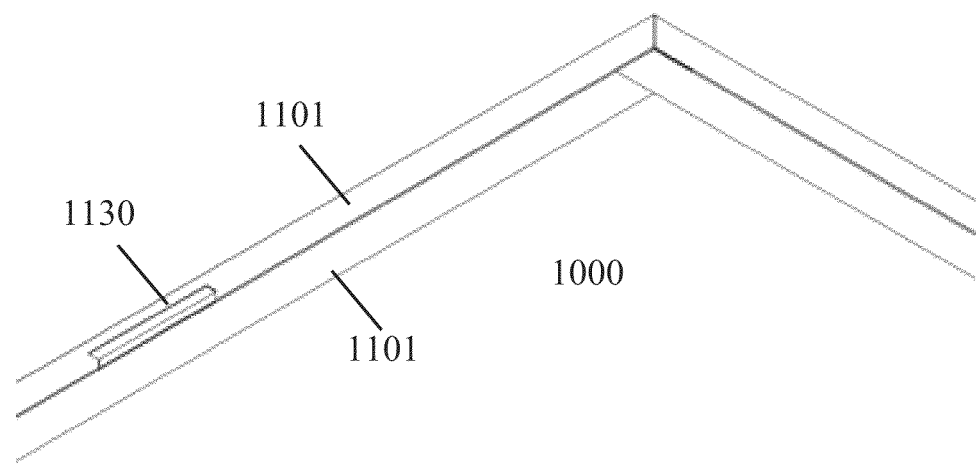
FIG. 9B depicts a close up perspective view of a portion of an example embodiment of a frameless optical lens with mounting tab.

In an alternative implementation of the disclosed technology, plastic or metal rivets, or any type of protuberance may be utilized and fastened to edge trusses in place of the tabs 1130 as shown and described in FIGS. 9A and 9B. For example, plastic rivets such as "push in" plastic rivets with shafts that incorporate locking features may be utilized. Said plastic rivets for example, may have pliable barbs that compress during insertion and subsequently keep the rivet secured within the substrate. The rivets may be installed through holes suitably located on two or more edge trusses on an example embodiment, such that the rivet heads are disposed inside the lens, and the rivet shafts protrude outside the lens. When an example embodiment of lens is installed on a light fixture such as shown in FIG. 9A, the rivet shafts may nest in slots

1505 in a similar fashion to the tabs 1130. Any type of clip that may suitably and securely fastened to edge trusses, and may also securely nest within slots, holes or edges within a light fixture may be utilized. Accordingly, the disclosed novel method of attaching an example embodiment of frameless lens to a light fixture enclosure is not limited to tabs 1130 as shown in FIG. 9A, and may include a wide variety of other mechanical fastening devices without departing from the scope of the disclosed technology.

Certain light fixture enclosures may have ridges, folds or other suitable fastening areas disposed on the inside of the enclosure in proximity to the edge sections of example embodiments, wherein the tabs 1130 may nest inside the ridges, folds, or other suitable fastening areas, instead of slots or holes 1505.

The example embodiment of frameless lens described may have several advantages. Typical troffer light fixtures utilize doorframes (such as doorframe 1500 shown in FIG. 6B). Such doorframes may include multiple parts, such as frame members, hinges, clasps, rivets etc, and together with assembly labor, may comprise a significant manufacturing cost. Example embodiments of frameless lenses may eliminate the need for all (or a portion of) a doorframe, along with the associated costs and weight.

Typical doorframes may be approximately 5/8" wide, which may comprise a total surface area of approximately 55 sq. in for a 2'×2' fixture, which may reduce the usable surface area of the optical aperture of the light fixture by that amount. The example embodiments of frameless lens may have the advantage of utilizing substantially a light fixture's entire optical aperture, and may increase the usable surface area of the optical aperture by approximately 10%. This may increase the efficiency and light dispersion pattern of the light fixture, and may be visually more pleasing.

An embodiment of a frameless optical film lens with a curved lens face will now be described. FIG. 10A shows an example inside perspective view, and FIG. 10B shows an example outside perspective view of an example embodiment that utilizes a curved lens face 1000. An example embodiment may include an optical film center section 1011, and two optical film side sections 1010. In one example implementation, the center section 1011 may be curved, and may protrude past the edge trusses 1101. Accordingly, the lens may protrude outside a light fixture enclosure, and if the light fixture face is mounted flush with a ceiling, the lens may protrude below the ceiling line. This example embodiment may possess several advantages over other example embodiments with flat lens faces. The lamp to lens distance, for example, may be effectively increased without the modification of the light fixture. Modification of the depth of a light fixture enclosure may incur significant costs such as retooling, additional manufacturing costs etc. Increasing the lamp to lens distance may have the advantage of increased diffusion and lamp hiding. Because of increased diffusion, the haze rating of an optical film(s) utilized may be decreased in order to achieve a similar diffusion level when compared to the same light fixture with an example embodiment characterized by a flat lens face with a shorter lamp to lens distance. This decrease in haze rating of the optical film may result in increased efficiency of the light fixture while exhibiting similar overall diffusion and lamp hiding.

Another advantage of the example embodiment may be significantly increased visual appeal without a significant increase in manufacturing cost compared to other example embodiments with flat lens faces. For example, a conventional one-piece acrylic/polycarbonate lens (typically used in light fixtures), with a similar shape to the example embodiments described herein, may require that the lens be manufactured by injection molding or other suitable method, and may not be able to be manufactured by extruding. This may require significant tooling costs, especially on larger sized lens configurations, and the unit manufacturing costs may be significantly higher when compared to extruded lenses. A conventional acrylic lens, similar in shape to the example embodiments disclosed herein, may also have a significant weight, which may require the lens to have a doorframe; the disadvantages of which have been previously described. Additionally, the increased lens thickness and diffusion materials used in conventional configurations may significantly decrease the optical efficiency.

FIG. 11B shows an example cutting template for optical film side sections 1010 of an example embodiment having score lines 1200 and edge sections 1100, as shown. According to an example implementation of the disclosed technology, a curved edge section 1351 may be formed along curved score line 1200. Referring to side profile view FIG. 11C, the optical film from (for example, as shown in FIG. 11B), once folded, may look similar to that as shown in FIG. 11C. For example, a structured surface 1022 of the optical film may be disposed on the outside of the side panel. In one example implementation, a curved edge section 1351 may be inserted into a channel extrusion that will be subsequently described. In an example implementation, the edge section 1100 may be significantly narrower than other edge sections, and the resulting edge truss may be sharply angled as shown, in order to reduce unwanted reflections and light loss within the light fixture/lens cavity. In one example implementation, corner holes 1156, as shown in FIG. 11B, may be configured such that when the lens is assembled, the holes may align with corresponding holes on an adjacent edge truss, and wherein a rivet may be fastened through the aligned holes.

Figures 10C, 10D:
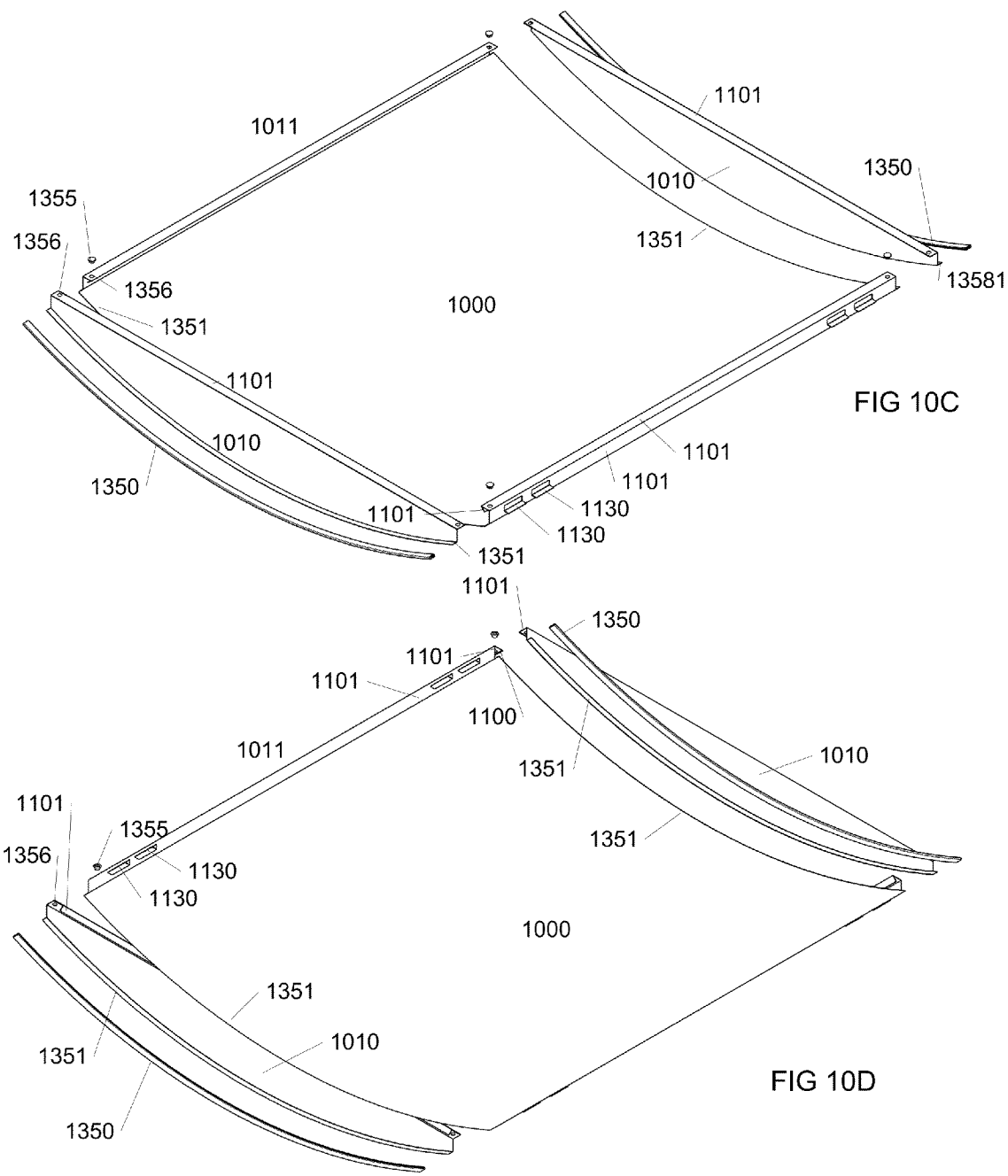
FIG. 10C shows an exploded perspective view of the back side of the example embodiment depicted in FIG. 10A.
FIG. 10D shows an exploded perspective view of the top side of the example embodiment depicted in FIG. 10B.
Figure 11A:
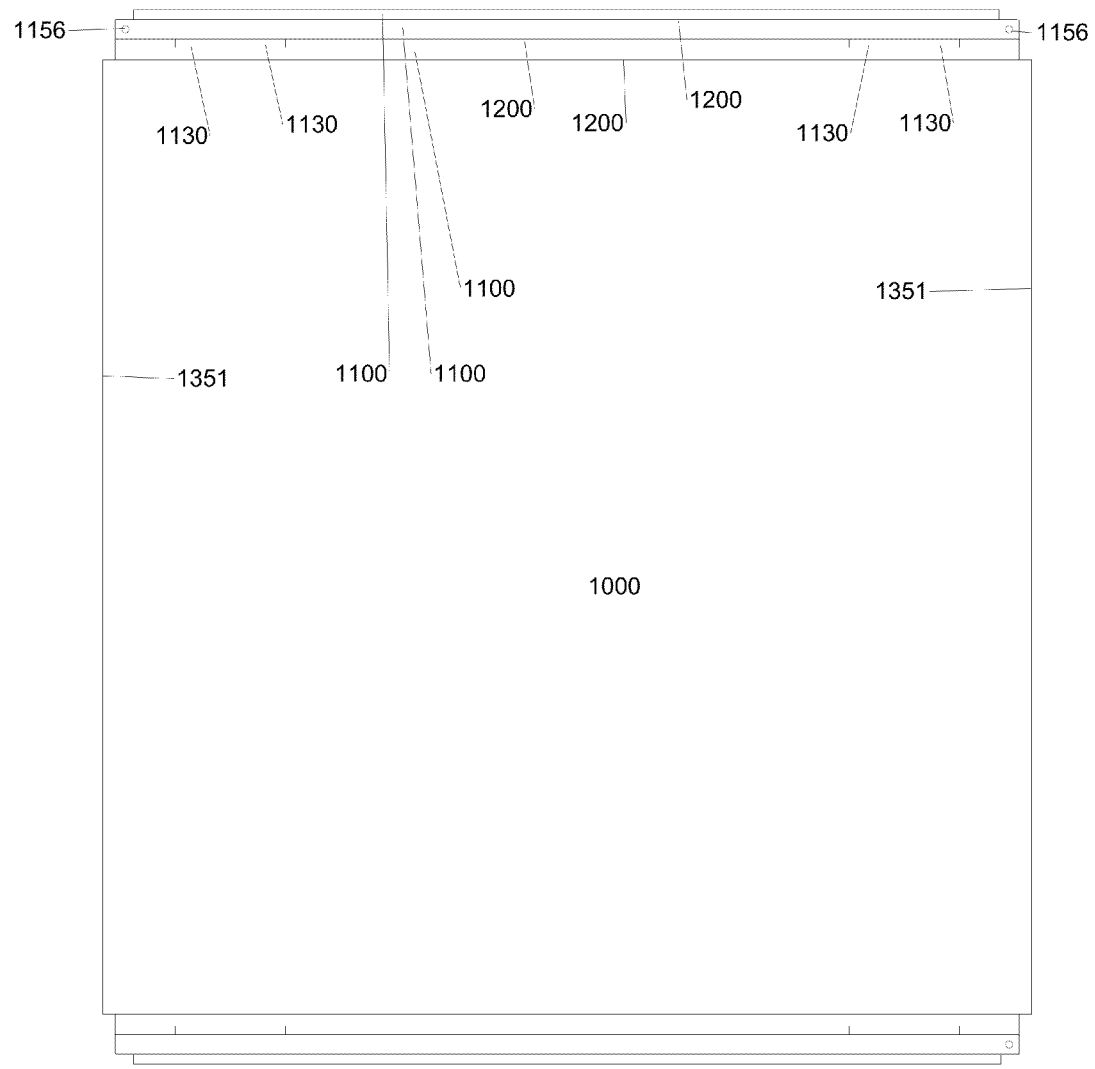
FIG. 11A depicts an optical film cutting template for the optical film center section of the example embodiment of a frameless optical lens as depicted in FIG. 10A.

FIG. 11A shows an example embodiment of a cutting template for the optical film center section 1011, with a lens face 1000 and score lines 1200 with corresponding edge sections 1100 depicted. Example cut lines are depicted for mounting tabs 1130, along with holes 1156, which may be configured and function as previously described. The edge sections 1351 may subsequently be attached to the corresponding edge sections 1351 on side panels (for example, the side panels 1010 shown in FIG. 10A). An example implementation of a side profile of the configured curved section is shown in FIG. 11D. In this embodiment, the structured surface of the lens face 1022 may be disposed on the outside of the lens. The edge sections 1100 may be configured in a similar manner to the edge sections of the optical film side sections as previously described. Mounting tabs 1130 may be folded outwards as shown, and may function to fasten the lens assembly into a light fixture as described in a previous example embodiment.

Referring to FIGS. 10C and 10D, a curved edge section 1351 of side section 1010 may be inserted into a channel-style semi-rigid extrusion 1350, according to an example implementation. The extrusion 1350, for example, may comprise any semi-rigid molding that may serve to secure edge section 1351 of the side section 1010 to the corresponding edge section 1351 on the curved center section 1011, which may include U-channel, C-channel, clips, spring clips etc. Alternatively, sections 1351 may be fastened together without any external fasteners, and may be glued, sonically welded together, or fastened in any other suitable method that may be cosmetically acceptable to the application. In an example implementation, the curved edge section 1351 of side section 1010 may be inserted into the extrusion 1350, and the extrusion may bend and formed to the curve of the edge section

1351, which may create a suitably rigid frame with the required profile. In certain example implementations, edge sections 1351 from center section 1011 may be inserted into the extrusion channels, and the center section 1011 may bend according to the curvature of the extrusion 1350.

In certain example implementations, overlapping corners of adjacent edge trusses 1101 may be fastened together using plastic rivets 1355 or other suitable fastening devices inserted through holes 1356. Adhesive tape or adhesive may also be utilized to fasten the overlapping corner sections together. Mounting tabs 1130 are shown. Two pairs of mounting tabs per side instead of two mounting tabs per side may give additional attachment force, which may be preferable in some applications.

FIGS. 10A and 10B show perspective views of the assembled example embodiment of frameless lens, which may be suitable to mount in a light fixture as described in other example embodiments. Curved optical film center section 1011 with a lens face 1000 may be securely attached to the optical film side sections 1010 with extrusions 1350. Mounting tabs 1130 on edge trusses 1101 may attach to the interior of a light fixture that may secure the lens to the light fixture as previously described.

Example embodiments need not comprise optical film side panel 1010 as described. In certain example implementations, the side panels may be solid and not configured from optical film. For example, the side panels may be configured from molded plastic, which may contain curved channels to accept the edges from the optical film center section 1011, and may contain features to secure the edge sections 1100 from center section 1011. The solid side panels may also comprise mounting features to mount on a light fixture.

Figure 12A:
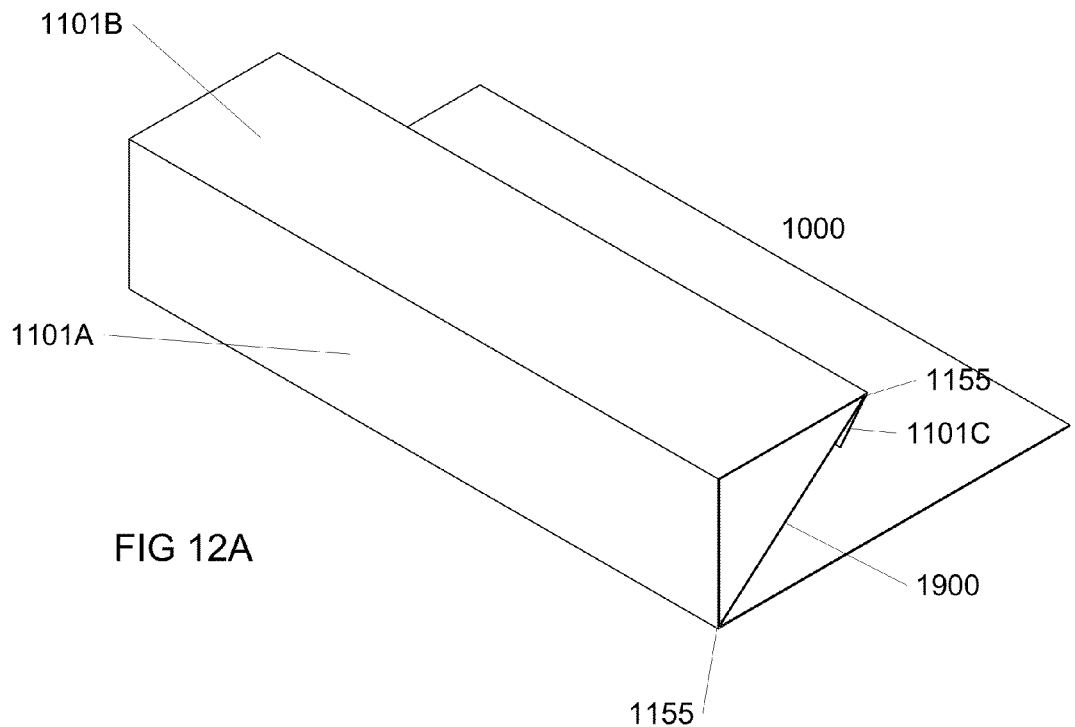
FIG. 12A depicts a perspective view of one edge truss and portion of a lens face, with an edge truss insert nested therein.
Figure 12B:
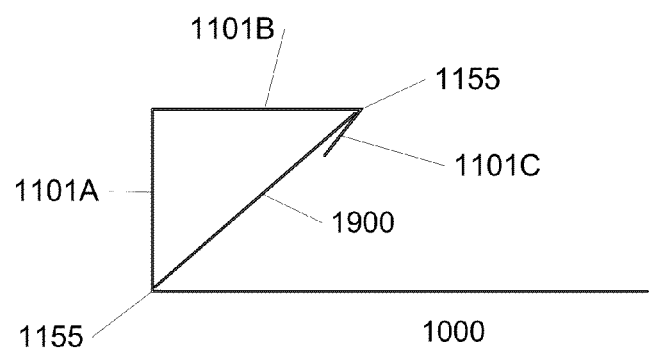
FIG. 12B shows a side cross sectional view of the edge truss and insert depicted in FIG. 12A.

In certain example implementations, an edge truss insert may nest in edge trusses to provide increased light output and increased rigidity, and will now be described with reference to FIG. 12A and FIG. 12B. Referring to FIG. 12A, and according to an example implementation, a small section of a frameless is depicted with a portion of a lens face 1000. This example implementation may include an edge truss with three sides (1101A 1101B 1101C). FIG. 12B shows a cross sectional view of the same embodiment as shown in FIG. 12A. For example, a strip of material, which may form an insert 1900, preferably with good reflection properties and configured to suitable dimensions, may be inserted inside the edge truss, wherein each of the two longer edges of the insert 1900 may be disposed on or near two opposing or adjacent folds 1155 of edge truss sides 1101. In the example embodiment shown, the edge truss may be configured with two approximately square sides (1101A, 1101B) along with a smaller more angled side 1101C. This particular example geometrical configuration of an edge truss may provide certain mounting advantages.

According to certain example implementations, if the edge truss insert 1900 is fabricated from flexible material (such as from reflective optical film as described previously), it may be inserted into the edge truss and manually bent until the longer edges of the insert 1900 are disposed along the folds 1155. In another example implementation, if the reflective inserts are non-flexible, the edge truss sides 1101A, 1101B or 1101C may be bent outwards sufficiently to accept the insert 1900.

In certain example implementations, when mounted on a light fixture, the lip on the light fixture that the frameless lens may be mounted on may be visible through the lens, especially on lenses with low diffusion, which may be partially transparent. The light fixture lip may have holes or slots incorporated into it in order to mount a doorframe, or the lip may be painted black, such as on a recessed light fixture with parabolic louvers. In either case, it may be cosmetically unacceptable for an intended application to have these features visible through the lens. Edge truss inserts as described may function to hide these features from view.

According to an example implementations of the disclosed technology, edge truss inserts, as described, may function to decrease light loss, thereby increasing fixture efficiency. For example, a typical lip on a recessed light fixture may be L shaped, and the irregular surfaces may cause a degree of light loss due to increased multiple reflections. Some lip surfaces may also be painted black, as described with parabolic louvers, which may cause a further degree of light loss due to absorption. According to certain example implementations of the disclosed technology, reflective inserts, as previously described, may be utilized to create a single reflection plane that may cover the L shaped lip surface, and may thereby reduce light loss and increase efficiency. In certain example embodiments, high efficiency reflective material may be utilized (such as optical films previously described) that might have overall reflectance efficiencies of about 97%, and may provide an increased light fixture efficiency.

According to an example implementation of the disclosed technology, edge truss inserts, as described above, may also function to increase the rigidity and strength of edge trusses. Although edge truss configurations as described in example embodiments may be sufficient to allow the frameless lenses to be suspended in a suitably flat configuration, additional edge strength may be required in certain applications. For example, during installation and handling in the field, lenses may undergo a degree of stress and abuse, which could possibly cause them to bend, crease or break etc., especially on lenses with larger spans, such as a 4'×2' lens configuration. In accordance with an example implementation of the disclosed technology, any suitably rigid material may be used to fabricate an edge truss insert. For example, materials such as cardboard, card stock, bristle board, foam core board, plastic etc. may be used for an edge truss insert. In certain embodiments, it may be preferable that the material has good reflection properties in order to minimize light losses as described, and to have an acceptable cosmetic appearance. White card stock, foam core, or similar white paper materials, may have sufficiently acceptable reflection properties for many applications. UV protective coatings on the insert material may be preferable.

The patent application incorporated by reference in the first section of this document contain example embodiments of light fixtures and light fixture retrofits that utilize optical film assemblies that comprise one or more optical films suspended and tensioned on a frame in a substantially flat configuration. It should be noted that example embodiments of frameless optical film lenses described herein could be utilized in place of said optical film assemblies. Accordingly, all example embodiments of light fixtures and light fixture retrofits which may utilize optical film assemblies that comprise one or more optical films suspended and tensioned on a frame from the above mentioned patent applications, may also be deemed to utilize example embodiments of frameless optical film lenses described in this application.

Applications for use of example embodiments of frameless optical film lenses are not restricted to lighting fixtures. Any light emitting apparatus that contains a light source which may require a lens to modify the light from the light source, and which may be of suitable configuration to mount example embodiments of frameless optic film lenses thereon, may comprise a suitable application, for example in displays and light boxes.

According to one implementation of the disclosed technology, there is provided a light modifying element comprising one or more optical film pieces characterized by one or more edge trusses disposed at two or more opposing edges of at least one of the one or more optical film pieces. The one or more edge trusses are characterized by one or more folds of at least a portion of at least one of the one or more optical film pieces. The one or more edge trusses disposed at two or more opposing edges are further characterized to support the one or more optical film pieces in a substantially planar configuration. According to an implementation of the disclosed technology, the one or more optical film pieces are further configured for suspension by at least two edge trusses. According to an implementation of the disclosed technology, the one or more optical film pieces are further configured for suspension by at least a portion of a perimeter surface associated with at least one of the one or more optical film pieces.

According to an implementation of the disclosed technology, the one or more optical film pieces are further characterized by one or more fold lines comprising one or more of score lines, crimp lines or perforated lines. At least a portion of the one or more folds disposed at the two or more opposing edges of the one or more optical film pieces are made along one or more fold lines. According to an implementation of the disclosed technology, the one or more optical film pieces are further configured for attaching to a light emitting device.

According to an implementation of the disclosed technology, the one or more optical film pieces are further configured to lay in a substantially flat configuration when suspended along all, or a portion of a perimeter of the one or more optical film pieces or the edge trusses without requiring film tensioners or a tensioning frame.

According to an implementation of the disclosed technology, the one or more optical film pieces are further characterized by nested optical film pieces.

According to an implementation of the disclosed technology, the light modifying element is further characterized by two or more magnets configured to attach the light modifying element to a light emitting device.

According to an implementation of the disclosed technology, at least a portion of the one or more optical film pieces are configured to nest inside a lens-mounting doorframe of a light fixture.

According to an implementation of the disclosed technology, the one or more edge trusses on the two or more opposing edges of the one or more optical film pieces overlap adjacent edge trusses, and wherein adjacent overlapping edge trusses are configured for fastening to each other.

According to an implementation of the disclosed technology, the one or more edge trusses on two or more opposing edges of the one or more optical film pieces are further characterized by corner tabs, wherein the corner tabs are configured to fasten to adjacent edge trusses.

According to an implementation of the disclosed technology, the one or more optical film pieces are configured with two or more folded tabs, wherein the two or more folded tabs extend outwards from two or more edge trusses. The two or more folded tabs are configured to contact a portion of a light emitting apparatus for attaching the light modifying element to the light emitting apparatus.

According to an implementation of the disclosed technology, the light modifying element is further characterized by two or more mechanical protuberances that protrude through holes in the two or more edge trusses. The two or more mechanical protuberances are configured to contact a portion of a light emitting apparatus for attaching the light modifying element to the light emitting apparatus.

According to an implementation of the disclosed technology, the light modifying element is further characterized by one or more insert strips, the one or more insert strips characterized by a strip of material with two longer sides and two shorter sides. The two longer sides of the one or more insert strips are disposed along, and in proximity to two adjacent or opposing folds on the two or more opposing edges of the one or more optical film sheets. The one or more insert strips are further characterized to impart additional rigidity to the two or more edge trusses.

According to an implementation of the disclosed technology, the light modifying element is further characterized by one or more insert strips, the one or more insert strips characterized by a strip of reflective material with two longer sides and two shorter sides. The two longer sides of the one or more reflective insert strips are disposed along, and in proximity to two adjacent or opposing folds on the two or more opposing edges of the one or more optical film sheets. The one or more insert strips are further characterized to impart additional reflective efficiency to the light modifying element.

According to another implementation of the disclosed technology, there is provided a light modifying element comprising one or more optical film pieces characterized by a substantially curved optical film center section and two side sections. Each of the two side sections include at least one curved edge, wherein two opposing edges of the optical film center section are configured for fastening to the at least one curved edge of each of the side sections. The optical film center section is characterized by one or more edge trusses disposed at two opposing edges of at least one of the one or more optical film pieces. The one or more edge trusses are characterized by one or more folds of at least a portion of at least one of the one or more optical film pieces, and the one or more edge trusses are further configured to support the light modifying element in a substantially planar configuration in at least one direction.

According to an implementation of the disclosed technology, the light modifying element is configured for suspension by at least two edge trusses.

According to an implementation of the disclosed technology, the light modifying element is further configured for suspension by at least a portion of a perimeter surface associated with at least one of the one or more optical film pieces.

According to an implementation of the disclosed technology, the two side sections are comprised of optical film.

According to an implementation of the disclosed technology, the one or more optical film pieces of are further characterized by one or more fold lines comprising one or more of score lines, crimp lines or perforated lines. At least a portion of the one or more folds disposed at the two or more opposing edges of the one or more optical film pieces are made along one or more fold lines.

According to an implementation of the disclosed technology, the one or more optical film pieces are configured to attach to a light emitting device.

According to an implementation of the disclosed technology, the light modifying element further comprises two or more mechanical protuberances configured to protrude through holes in the one or more edge trusses disposed at two or more opposing edges. The two or more mechanical protuberances are configured to contact a portion of a light emitting apparatus for attaching the light modifying element to the light emitting apparatus.

According to an implementation of the disclosed technology, the one or more optical film pieces are further characterized by nested optical film pieces.

An example embodiment of the disclosed technology includes a lens comprising: one or more pieces of optical film configured for attaching to and modifying light from a light emitting device, the one or more pieces of optical film defining: a lens aperture having a lens aperture plane defined by two or more edges of at least a portion of the optical film; a front light-emitting side of the lens; a back light-receiving side of the lens; and two or more edge trusses configured from and corresponding to the two or more edges defining the lens aperture plane, wherein the two or more edge trusses are disposed towards the back light-receiving side of the lens. Each of the two or more edge trusses include one or more sides configured from a corresponding fold in the one or more optical films, wherein at least one of the one or more sides of each of the two or more edge trusses is configured at an angle relative to the lens aperture plane to impart support to the lens and to resist deflection of each edge truss.

In an example embodiment, the lens aperture is disposed in a substantially planar configuration when suspended from four or more points along the two or more edge trusses, or when suspended along all or a portion of a periphery of the front light-emitting side of the lens. In an example implementation, at least one of the one or more sides of the two or more edge trusses is configured at an angle of between +20 degrees and 90 degrees, or between −20 degrees and 90 degrees relative to the lens aperture plane. According to an example implementation, the one or more optical film pieces further comprise one or more of: score lines, crimp lines or perforated lines, wherein at least a portion of folds are created along the one or more of score lines, crimp lines or perforated lines.

In an example embodiment, the light emitting device may be a light fixture, wherein the lens is configured to nest inside a light fixture doorframe that attaches to the light fixture.

In an example embodiment, the two or more edge trusses are further configured to attach to the light emitting device at four or more points.

An example embodiment further includes four or more mechanical protuberances on the two or more edge trusses, wherein each mechanical protuberance is configured to attach to corresponding holes or slots in the light emitting device.

In an example embodiment, at least four tabs are configured on the two or more edge trusses, wherein the tabs extend outwards from each of the two or more edge trusses, and wherein each tab is configured to contact a portion of the light emitting device for attaching the lens to the light emitting device.

An example embodiment further includes one or more insert strips, the one or more insert strips characterized by a strip of material with two longer sides and two shorter sides, wherein the two longer sides of the one or more insert strips are disposed along, and in proximity to two adjacent or opposing folds on two or more opposing edge trusses, wherein the one or more insert strips impart rigidity and or increased reflective efficiency to the two or more opposing edge trusses.

In an example embodiment, the one or more pieces of optical film comprises one or more nested optical film layers covering all or a portion of the lens aperture.

An example embodiment of the disclosed technology includes a light-modifying element for modifying light from a light emitting device. The light-modifying element includes: at least one piece of optical film, the at least one piece of optical film comprising: four edges; a light-emitting front side; and a light-receiving back side; and at least one fold on each of the four edges, wherein each fold defines an edge section at an angle relative to the light-emitting front side, and wherein each of the four edges are disposed towards the light-receiving back side, and wherein each edge section imparts structural support to the light modifying element such that the light modifying element will be disposed in a substantially flat configuration when suspended from four or more points along two or more edge sections, or when suspended along all or a portion of a periphery of the front side of the at least one optical film piece.

In an example embodiment, each edge section borders each corresponding edge of the at least one optical film piece and wherein each edge section is configured at an angle of between +20 degrees and 90 degrees, or between −20 degrees and 90 degrees relative to a plane defined by the light-emitting front side.

In an example embodiment, the at least one optical film piece further comprises two or more folds and two or more corresponding edge sections along two or more edges of the at least one optical film piece.

In an example embodiment, the at least one optical film piece further comprises one or more of: score lines, crimp lines or perforated lines, wherein the folds configured along each edge of the at least one optical film piece are created along the one or more of score lines, crimp lines or perforated lines.

In an example embodiment, the at least one piece of optical film comprises one or more nested optical film layers covering all or a portion of the back of the at least one optical film piece.

An example embodiment of the disclosed technology includes a light fixture. The light fixture includes an enclosure having an aperture; a light source disposed inside the enclosure; and a lens covering all or a portion of the aperture, the lens configured for modifying light from the light source and comprising at least one piece of optical film, the at least one piece of optical film comprising: four edges; a light-emitting front side; a light-receiving back side; and at least one fold configured along each of the four edges, wherein each fold creates an edge section at an angle relative to the light-emitting front side, and wherein each edge section is disposed towards the light-receiving back, and wherein each edge section imparts structural support to the light modifying element such that the light modifying element will be disposed in a substantially flat configuration when suspended from four or more points along two or more edge sections, or when suspended along all or a portion of a periphery of the light-emitting front side.

In an example embodiment, the lens is suspended along the periphery of light-emitting front side in a doorframe attached to the light fixture.

In an example embodiment, the lens is suspended in the light fixture from four or more points along two or more edge sections.

In an example embodiment, the at least one piece of optical film further comprises one or more of: score lines, crimp lines or perforated lines, wherein at least a portion of folds are created along the one or more of score lines, crimp lines or perforated lines.

In an example embodiment, the at least one piece of optical film further comprises two or more folds and two or more corresponding edge sections along two or more edges of the at least one optical film piece.

In an example embodiment, the edge section bordering each edge of the at least one piece of optical film is configured at an angle of between +20 degrees and 90 degrees, or between −20 degrees and 90 degrees relative to a plane defined by the a light-emitting front side An example embodiment of the disclosed technology includes a light fixture. The light fixture includes an enclosure with an aperture; a light source disposed inside the enclosure; and one or more lenses covering all or a portion of the aperture, the one or more lenses configured for modifying light from the light source, and comprising at least one piece of optical film with a thickness of under 325 um, wherein the at least one piece of optical film is disposed in a substantially planar configuration without mechanical tensioners or a supporting substrate.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A lens comprising:
  one or more pieces of optical film configured for attaching to and modifying light from a light emitting device, the one or more pieces of optical film defining:
    a lens aperture having a lens aperture plane defined by two or more edges of at least a portion of the optical film;
    a front light-emitting side of the lens;
    a back light-receiving side of the lens;
    two or more edge trusses configured from and corresponding to the two or more edges defining the lens aperture plane, wherein the two or more edge trusses are disposed towards the back light-receiving side of the lens;
  each of the two or more edge trusses include one or more sides configured from a corresponding fold in the one or more optical films, wherein at least one of the one or more sides of each of the two or more edge trusses is configured at an angle relative to the lens aperture plane to impart support to the lens and to resist deflection of each edge truss; and
  four or more attachment devices configured on two or more edge trusses, wherein each attachment device is configured to attach the lens to a light emitting device, the four or more attachment devices comprising one or more of: mechanical protuberances, mechanical fastening devices, clips, rivets, edge truss tabs, hook and loop fasteners, and magnets.

2. The lens of claim 1, wherein the lens aperture is disposed in a substantially planar configuration when suspended from four or more points along the two or more edge trusses, or when suspended along all or a portion of a periphery of the front light-emitting side of the lens.

3. The lens of claim 1, wherein at least one of the one or more sides of the two or more edge trusses is configured at an angle of between + 20 degrees and 90 degrees, or between − 20 degrees and 90 degrees relative to the lens aperture plane.

4. The lens of claim 1, wherein the one or more optical film pieces further comprise one or more of: score lines, crimp lines or perforated lines, wherein at least a portion of folds are created along the one or more of score lines, crimp lines or perforated lines.

5. The lens of claim 1, wherein the light emitting device is a light fixture, wherein the lens is configured to nest inside a light fixture doorframe that attaches to the light fixture.

6. The lens of claim 1, wherein the two or more edge trusses are further configured to attach to the light emitting device at four or more points.

7. The lens of claim 1, wherein each mechanical protuberance is configured to attach to corresponding holes or slots in the light emitting device.

8. The lens of claim 1, wherein the edge truss tabs are configured on the two or more edge trusses, wherein the edge truss tabs extend outwards from each of the two or more edge trusses, and wherein each edge truss tab is configured to contact a portion of the light emitting device for attaching the lens to the light emitting device.

9. The lens of claim 1, further comprising one or more insert strips, the one or more insert strips characterized by a strip of material with two longer sides and two shorter sides, wherein the two longer sides of the one or more insert strips are disposed along, and in proximity to two adjacent or opposing folds on two or more opposing edge trusses, wherein the one or more insert strips impart one or more of rigidity and increased reflective efficiency to the two or more opposing edge trusses.

10. A lens assembly comprising:
  a light fixture doorframe capable of attaching to a light fixture, the light fixture doorframe comprising:
    four sides with an opening defined by the four sides, wherein the opening defines an aperture plane, and wherein each side includes a lens-mounting channel comprising:
      a support segment adjacent to the opening, wherein the support segment is substantially parallel to the aperture plane;
      a side segment disposed substantially perpendicular to the support segment, wherein the support segment and the side segments collectively form the lens-mounting channel in the doorframe that is capable of nesting a lens therein; and
  a lens comprising:
    a piece of optical film configured for modifying light from a light emitting device, the piece of optical film comprising:
      a front light-emitting side;
      a back light-receiving side;
      four major edges;
      four corner regions, each having one or more associated minor edges defining one or more corner cuts that define a corner cutout;
      one or more of a score line, perforated line and crimp line adjacent to all, or a substantial portion of each of the four major edges, wherein each of the one or more of a score line, perforated line and crimp line terminates in proximity to a one or more of a score line, perforated line and crimp line in an adjacent major edge in a corresponding corner region of the optical film piece, wherein an area of the piece of the optical film between each of the one or more of score lines, perforated lines and crimp lines defines a lens aperture; and an edge truss configured from a fold in the piece of optical film along each of the one or one or more of score lines, perforated lines and crimp lines, wherein each edge truss is configured at an angle relative to the lens aperture such that each edge truss is disposed towards the back light-receiving side of the optical film piece and is configured to impart support to the lens and to resist deflection of the lens to enable the lens to be disposed in a substantially flat configuration without tensioners or tensioning from the doorframe when all, or a portion of the periphery of the light-emitting side of the lens is supported by the support segment.

11. The lens assembly of claim 10, wherein each edge truss is configured at an angle of between +20 degrees and 90 degrees, or between −20 degrees and 90 degrees relative to the lens aperture plane.

12. The lens assembly of claim 10, wherein the piece of optical film further comprises two of one or more of a score line, perforated line and crimp line adjacent to all, or a substantial portion of two or more of the four major edges of the piece of optical film, and an edge truss is configured from folds in the piece of optical film along each of the one or one or more of score lines, perforated lines and crimp lines.

13. The lens assembly of claim 10, wherein the piece of optical film further comprises three of one or more of a score line, perforated line and crimp line adjacent to all, or a substantial portion of two or more of the four major edges of the piece of optical film, and an edge truss is configured from folds in the piece of optical film along each of the one or one or more of score lines, perforated lines and crimp lines.

14. The lens assembly of claim 10, wherein the piece of optical film further comprises one or more insert strips, the one or more insert strips characterized by a strip of material with two longer sides and two shorter sides, wherein the two longer sides of the one or more insert strips are disposed along, and in proximity to two adjacent or opposing folds on two or more opposing edge trusses, wherein the one or more insert strips impart one or more of rigidity and increased reflective efficiency to the two or more opposing edge trusses.

15. The lens assembly of claim 10, wherein the piece of optical film comprises one or more nested optical film layers covering all or a portion of the lens aperture.

16. A lens comprising:
a piece of optical film configured for attaching to and modifying light from a light emitting device, the piece of optical film comprising:
a front light-emitting side;
a back light-receiving side;
four major edges;
four corner regions, each having one or more associated minor edges defining one or more corner cuts that define a corner cutout;
one or more of a score line, perforated line and crimp line adjacent to all, or a substantial portion of each of the four major edges, wherein each of the one or more of a score line, perforated line and crimp line terminates in proximity to a one or more of a score line, perforated line and crimp line in an adjacent major edge in a corresponding corner region of the optical film piece, wherein an area of the piece of the optical film between each of the one or more of score lines, perforated lines and crimp lines defines a lens aperture; and an edge truss configured from a fold in the piece of optical film along each of the one or one or more of score lines, perforated lines and crimp lines, wherein each edge truss is configured at an angle relative to the lens aperture such that each edge truss is disposed towards the back light-receiving side of the optical film piece;

wherein each edge truss is configured to impart support to the lens and to resist deflection of the lens to enable the lens to be disposed in a substantially flat configuration without tensioners or tensioning from an external frame when suspended along all, or a portion of the periphery of the front light-emitting side of the optical film piece, or suspended from four or more points on two or more edge trusses.

17. The lens of claim 16, wherein each edge trusses is configured at an angle of between +20 degrees and 90 degrees, or between −20 degrees and 90 degrees relative to the lens aperture plane.

18. The lens of claim 16, wherein the piece of optical film further comprises two of one or more of a score line, perforated line and crimp line adjacent to all, or a substantial portion of two or more of the four major edges of the piece of optical film, and an edge truss is configured from folds in the piece of optical film along each of the one or one or more of score lines, perforated lines and crimp lines.

19. The lens of claim 16, wherein the piece of optical film further comprises three of one or more of a score line, perforated line and crimp line adjacent to all, or a substantial portion of two or more of the four major edges of the piece of optical film, and an edge truss is configured from folds in the piece of optical film along each of the one or one or more of score lines, perforated lines and crimp lines.

20. The lens of claim 16, wherein the corner cuts are further defined by one or more cuts through the piece of optical film that extend across a corner region, extending from a corresponding major film edge to an adjacent major film edge, and that pass through or near where the corresponding one or more of a score lines, perforated lines and crimp lines intersect or terminates in proximity to each other in the corner region, and wherein the section of the optical film piece abutting the one or more cuts in the optical film is removed.

21. The lens of claim 16, wherein the piece of optical film further comprises one or more nested optical film layers covering all or a portion of the lens aperture.

22. A method, comprising:
configuring a lens from a piece of optical film for attaching to and modifying light from a light emitting device, wherein the piece of optical film comprises a front light-emitting side, a back light-receiving side, and four major edges, wherein the four major edges define four corresponding corner regions;
creating one or more of a score line, perforated line and crimp line adjacent to all, or a substantial portion of each of the four major edges, wherein each of the one or more of the score line, perforated line and crimp line terminates in proximity to a one or more of a score line, perforated line and crimp line in an adjacent major edge in a corresponding corner region of the optical film piece, wherein an area of the piece of the optical film between each of the one or more of score lines, perforated lines and crimp lines defines a lens aperture;
cutting each corner region of the piece of optical film to create corner cuts, wherein each corner cut comprises one or more cuts extending across a portion of the corner region and through the piece of optical film, each corner cut extending from a major edge to an adjacent corresponding major edge;

removing one or more sections of the piece of optical film defined by the corner cuts; and folding the piece of optical film along each of the one or more score lines, perforated lines and crimp lines to create a corresponding edge truss, wherein each edge truss is configured at an angle relative to the lens aperture such that each edge truss is disposed towards the back light-receiving side of the optical film piece;

wherein each edge truss is configured to impart support to the lens and to resist deflection of the lens to enable the lens to be disposed in a substantially flat configuration without tensioners or tensioning from an external frame when suspended along all, or a portion of the periphery of the front light-emitting side of the optical film piece, or suspended from four or more points on two or more edge trusses.

* * * * *